(12) United States Patent
Davenport et al.

(10) Patent No.: US 12,324,379 B2
(45) Date of Patent: Jun. 10, 2025

(54) EXPANDABLE PIVOT IRRIGATION SYSTEM

(71) Applicant: Square Water LLC, Laramie, WY (US)

(72) Inventors: Ross Davenport, Laramie, WY (US); Wayne Pinch, Laramie, WY (US)

(73) Assignee: Square Water LLC, Laramie, WY (US)

( * ) Notice: Subject to any disclaimer, the term of this patent is extended or adjusted under 35 U.S.C. 154(b) by 796 days.

(21) Appl. No.: 16/997,453

(22) Filed: Aug. 19, 2020

(65) Prior Publication Data

US 2021/0051866 A1 Feb. 25, 2021

Related U.S. Application Data

(60) Provisional application No. 62/888,837, filed on Aug. 19, 2019.

(51) Int. Cl.
*A01G 25/09* (2006.01)
*A01G 25/16* (2006.01)
*F16L 3/01* (2006.01)

(52) U.S. Cl.
CPC ........... *A01G 25/092* (2013.01); *A01G 25/16* (2013.01); *F16L 3/01* (2013.01)

(58) Field of Classification Search
CPC ...... A01G 25/09; A01G 25/092; A01G 25/16; A01G 25/097; A01G 25/00–167; F16B 7/1472; F16L 3/18; F16L 51/02; F16L 27/12; F16L 3/01; F16L 37/34; F16L 37/413; F16L 43/006; F16L 51/00; B05B 13/005; B05B 13/02; B05B 13/0207; B05B 13/0264; B05B 13/0271; B05B 13/0278; B05B 13/0484; B05B 12/30
USPC .................................. 239/11, 165, 167, 728
See application file for complete search history.

(56) References Cited

U.S. PATENT DOCUMENTS

| | | | | |
|---|---|---|---|---|
| 4,033,508 | A * | 7/1977 | Jacobi | A01G 25/092 239/729 |
| 4,120,454 | A * | 10/1978 | Holtzen | A01G 25/092 239/731 |
| 6,085,999 | A * | 7/2000 | Gerdes | A01G 25/092 239/69 |
| 6,951,185 | B1 * | 10/2005 | Wiese | F16B 7/20 403/349 |
| 2017/0251589 | A1 * | 9/2017 | Tippery | A01B 51/02 |

* cited by examiner

*Primary Examiner* — Arthur O. Hall
*Assistant Examiner* — Juan C Barrera
(74) *Attorney, Agent, or Firm* — Kilpatrick Townsend & Stockton LLP

(57) ABSTRACT

An expansion joint for a pivot irrigation system includes an inner support member having an elongate body terminating in ends having diameters that are larger than a diameter of the elongate body, a first external support member, and a second external support member. Each of the first external support member and the second external support member define an open interior that is configured to slidingly receive a respective end of the inner support member. Each of the first external support member and the second external support member in a stop member positioned on either end of the open interior that limit a range of movement of the respective end of the inner support member.

8 Claims, 22 Drawing Sheets

EXPANDABLE PIVOT IRRIGATION SYSTEM

RELATED APPLICATIONS

This application claims the benefit of U.S. Provisional Application No. 62/888,837, filed Aug. 19, 2019, which is assigned to the assignee hereof, and incorporated herein in its entirety by reference.

BACKGROUND OF THE INVENTION

Current crop irrigation systems often use center pivot systems in which irrigation equipment is rotated around a pivot and crops are watered with sprinklers. While generally effective, such forms of irrigation result in a circular area centered about the pivot being irrigated, while corners of oftentimes rectangular fields are left unwatered. For a square field, over 21% of land area may be left unwatered. To address these issues, many applications utilized end guns and/or swing arms to water the corners. However, these guns tend to spray well-beyond the field boundaries and end up wasting considerable amounts of water, and swing arms tend to be quite problematic. Improvements in the field of crop irrigation are desired.

BRIEF SUMMARY OF THE INVENTION

Embodiments of the present invention are directed to improved pivot irrigation systems that reduce the amount of land that remains unwatered without the need for end guns and/or swing arms. The embodiments utilize a self-expanding center pivot system that is designed to expand toward corners of a field while contracting as the pivot approaches the mid-points of the sides of the fields. As a result, the pivot has an irrigation path that is generally rectangular (with rounded corners), rather than circular as provided by conventional pivot irrigation systems. The expandable pivot irrigations systems described herein provide enhanced efficiency, and thus greater crop yields, without the need for added water waste due to the use of end guns.

In one embodiment, an expansion joint for a pivot irrigation system is provided. The expansion joint may include an inner support member having an elongate body terminating in ends having diameters that are larger than a diameter of the elongate body, a first external support member, and a second external support member. Each of the first external support member and the second external support member may define an open interior that is configured to slidingly receive a respective end of the inner support member. Each of the first external support member and the second external support member may include a stop member positioned on either end of the open interior that limit a range of movement of the respective end of the inner support member.

In some embodiments, each of the first external support member and the second external support member may be configured to be coupled to a span of the pivot irrigation system. In some embodiments, the expansion joint includes a bushing provided within the open interior of each of the first support member and the second external support member. Each stop member may be formed from an interior-facing end of a respective one of the bushings. In some embodiments, a portion of each end of the inner support member may be formed from a bushing having a larger diameter than the diameter of the elongate body. In some embodiments, each bushing may be fastened to a respective end of the inner support member using a nut. In some embodiments, the expansion joint may also include at least one sealing member positioned near a medial portion of each of the first external support member and the second external support member.

In a compressed state, the ends of the inner support member may be positioned against stops that are positioned at a distal end of each of the first external support member and the second external support member. In an expanded state, the ends of the inner support member may be positioned against stops that are positioned at a medial portion of each of the first external support member and the second external support member. In some embodiments, the stops at the distal end of each of the first external support member and the second external support member may include solid plates. In some embodiments, the expansion joint may further include an additional set of external and inner support members arranged in parallel with the inner support member, the first external support member, and the second external support member. In some embodiments, the expansion joint may also include at least one reinforcement member that couples the inner support member, the first external support member, and the second external support member with the additional set of external and inner support members.

In another embodiment, a pivot irrigation system may be provided. The system may include a pivot structure having a plurality of pivots that are coupled end to end in series. The plurality of pivots may include a center pivot and at least one additional pivot coupled with the center pivot. Connections between at least some adjacent ones of the plurality of pivots may include an expansion joint. Each expansion joint may include an inner support member having an elongate body terminating in ends having diameters that are larger than a diameter of the elongate body, a first external support member, and a second external support member. Each of the first external support member and the second external support member may define an open interior that is configured to slidingly receive a respective end of the inner support member. Each of the first external support member and the second external support member may include a stop member positioned on either end of the open interior that limit a range of movement of the respective end of the inner support member.

In some embodiments, at least one fluid line may be coupled with the pivot structure. The at least one fluid line may be coupled with the pivot structure such that there is slack in the at least one fluid line when any of the expansion joints are not fully extended. A plurality of wheels may be coupled with the pivot structure. A controller may be configured to control operation of the plurality of wheels to drive movement and direction of the pivot irrigation system. The controller may control the operation of the plurality of wheels based on a predefined shape of a watering path for the pivot irrigation system. The predefined shape of the watering path may be non-circular. Expansion of each expansion joint may be passively driven by rotational movement of the pivot structure. The system may also include a height adjustment mechanism that raises and lowers a height of the pivot structure. The height adjustment mechanism may include a scissor lift. A controller may be configured to control operation of the height adjustment mechanism in response to receiving a command.

In another embodiment, a method of operating a pivot irrigation system is provided. The method may include controlling a speed and heading of a plurality of wheels coupled with a pivot structure. The pivot structure may include a plurality of pivots that are coupled end to end in series. The plurality of pivots may include a center pivot and at least one additional pivot coupled with the center pivot. Connections between at least some adjacent ones of the plurality of pivots may include an expansion joint. The method may also include causing the expansion joints to expand and contract based on the heading of the plurality of wheels. The method may further include adjusting a height of the pivot structure. Each expansion joint may include an inner support member having an elongate body terminating in ends having diameters that are larger than a diameter of the elongate body, a first external support member, and a second external support member. Each of the first external support member and the second external support member may define an open interior that is configured to slidingly receive a respective end of the inner support member. Each of the first external support member and the second external support member may include a stop member positioned on either end of the open interior that limit a range of movement of the respective end of the inner support member.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to pivot irrigation systems that generate more efficient irrigation paths than conventional pivot systems. For example, rather than generating circular irrigation paths, the expandable pivot irrigation systems described herein are capable of generating generally rectangular irrigation paths and/or irregularly shaped irrigation paths (which may be done to avoid running the pivot irrigation system into trees, buildings, and/or other obstructions) by expanding the pivot equipment as the pivot equipment rotates toward the corners of a field and by contracting the pivot equipment as the pivot equipment rotates toward mid-points of the sides of a field. This is achieved by using expansion joints that are able to expand and contract with the movement of the pivot equipment. In some embodiments, these expansion joints may be purely mechanical in nature, such that no electric motors and/or other actuators are needed to control the expansion and contraction of the joints. Rather, the movement of the wheels of the pivot equipment itself are able to drive the operation of the expansion joints. While discussed primarily in relation to pivot irrigation systems, it will be appreciated that the expansion joints and drive mechanisms described herein may be utilized in various other applications, such as home sprinkler systems and/or other fluid delivery applications.

Figure 1A:
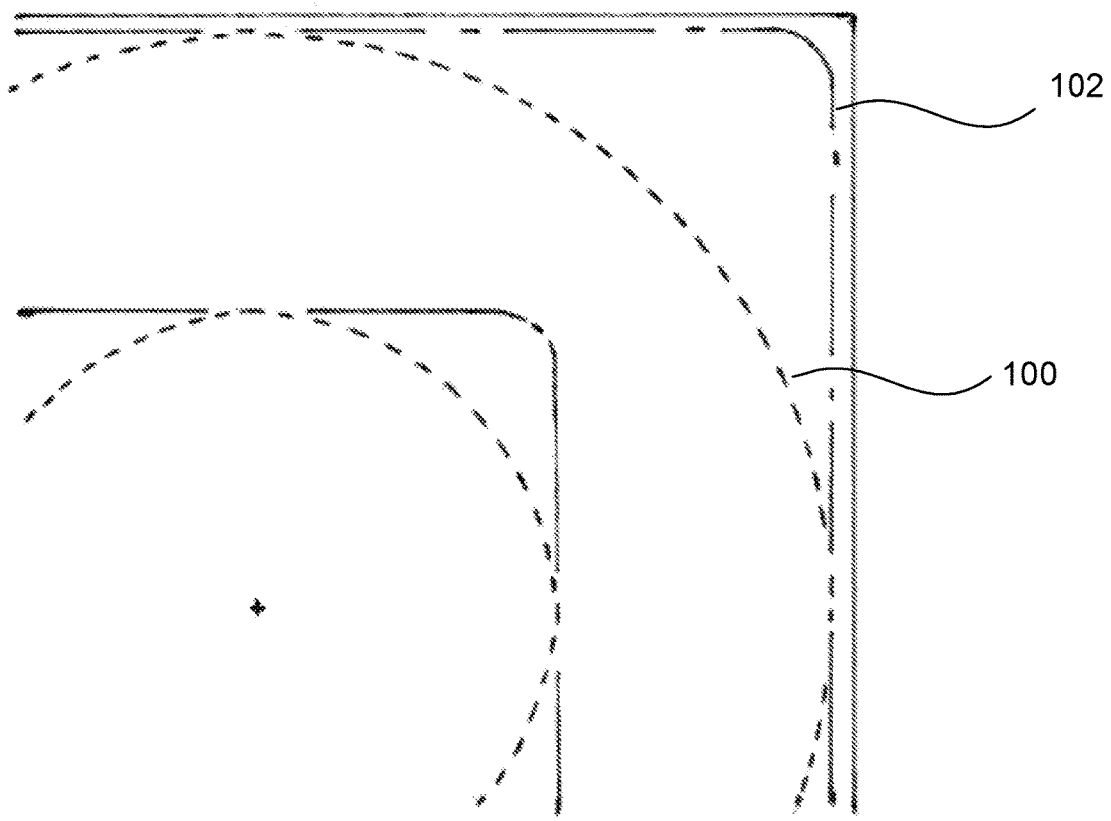
FIG. 1A illustrates various irrigation paths of a pivot system.

Such irrigation systems result in the ability to generate significantly higher crop yields, without the waste of water associated with the use of end guns to water corners of a field. For example, FIG. 1A, illustrates a conventional circular irrigation path 100 for a center pivot irrigation system. The conventional circular irrigation path 100 leaves a significant portion of the corner unwatered, with four corners of a square plot of land adding up to over 21% of the total area of the field being unwatered. For a standard quarter section of farmland (160 acres) this results in over 34 acres of land being unwatered. In contrast, a generally rectangular irrigation path 102 provided by the expandable pivot irrigation systems described herein significantly reduces the size of the unwatered corner sections and allows an irrigation area approaching the maximum 160 acres (or other land area) to be achieved. This allows the present expandable pivot irrigation system to generate significantly higher crop yields while limiting water waste. As just one example, if corn is planted on a quarter section at a rate of about 150 bushels per acre, a conventional pivot irrigation system produces less than 19,000 bushels of corn. In contrast, for the same quarter section, the expandable pivot irrigation system of the present invention may produce in excess of 23,000 and nearly 24,000 bushels of corn, resulting of an increase in about 27% yield.

As illustrated, the generally rectangular irrigation path 102 has slightly rounded corners at locations proximate the boundaries of the field. These rounded corners are the result of the turning radius of wheels used to drive the movement (speed and heading) of the pivot system as will be discussed in greater detail below. It will be appreciated that wheel systems that have sharper turning radii may be able to minimize the rounding of the corners and enable the pivot systems described herein to generate generally rectangular irrigation paths 102 that more closely mimic the dimensions of a given field.

Figure 1B:
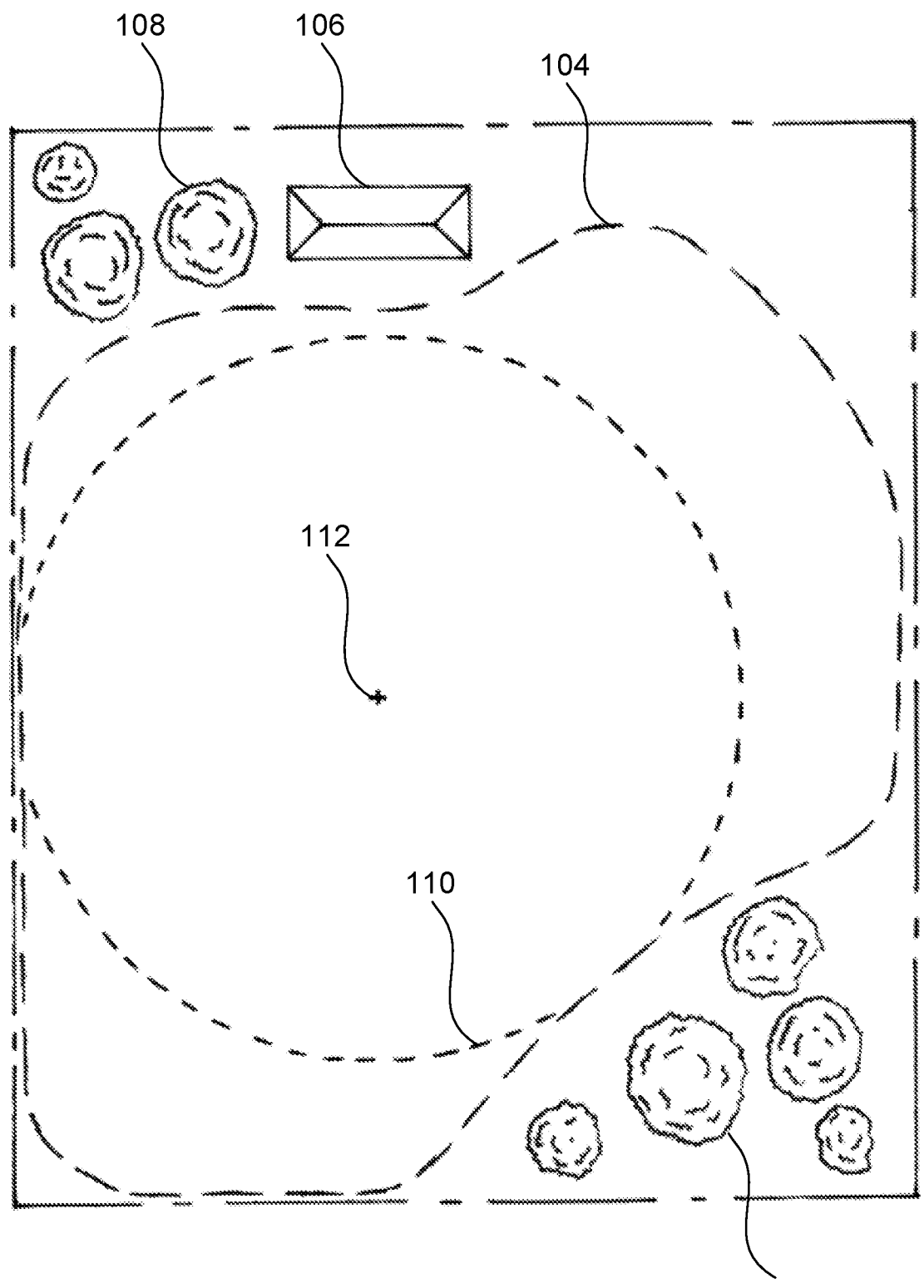
FIG. 1B illustrates various irrigation paths of a pivot system.

Additionally, in some embodiments wheel systems (which may include a controller, wheels, and a drive mechanism (such a motor) may be configured to drive movement of the pivot systems in multiple directions. Such wheel systems may be used to not only produce circular and/or generally rectangular shaped watering paths, but also watering paths that have other, oftentimes irregular shapes. As just one example, FIG. 1B illustrates one possible watering path 104 that may be generated by the pivot systems described herein. Here, watering path 104 has an irregular shape that enables the pivot system to avoid contact with obstructions, such as (but not limited to) building 106 and/or trees/shrubs 108. To avoid these obstructions with a conventional pivot system, a circular watering path 110 must be utilized, with a radius of the convention pivot system never exceeding a shortest distance from a center point 112 of the pivot system to a nearest one of the obstructions. This results in a severely diminished watering area. However, the expandable pivot systems of the present invention are able to steer around the obstructions to generate the irregularly shaped watering path 104 and significantly increase the watering area and subsequent crop yield. For example, by turning wheels of the pivot system outward relative to the center point 112, movement of the expandable pivot system causes the pivots to be extended or elongated in an outward direction to expand an outermost distance from the center point 112. By turning wheels of the pivot system inward relative to the center point 112, movement of the expandable pivot system causes the pivots to be contracted or shortened in an inward direction to reduce an outermost distance from the center point 112. As will be discussed in greater detail below, expansion of the pivot system may be driven by a pulling force created as the wheels turn away from the center point 112, while contraction of the system may be driven by a pushing force created as the wheels turn toward the center point 112.

Figure 2:
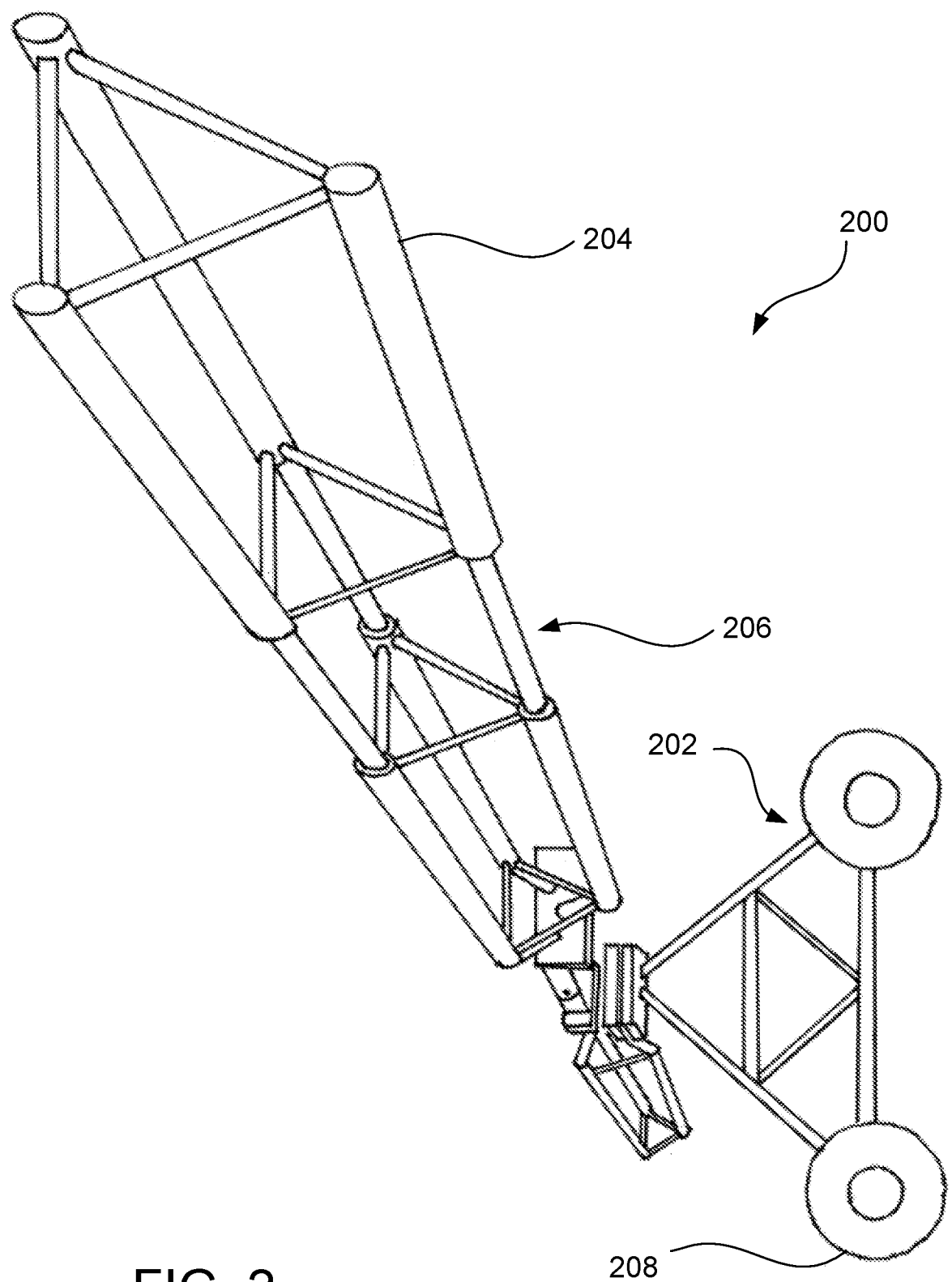
FIG. 2 depicts an expandable pivot irrigation system according to embodiments.
Figure 2A:
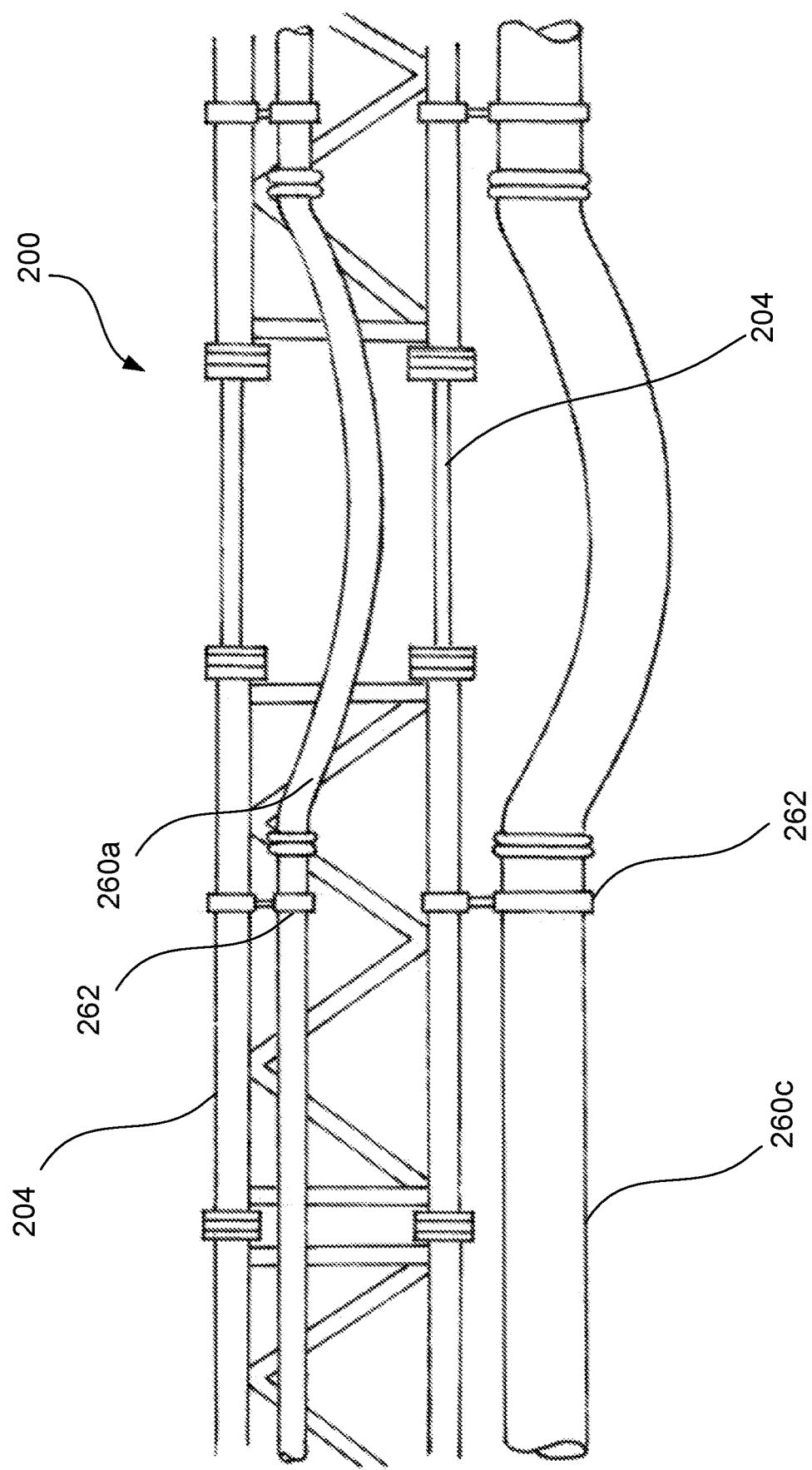
FIG. 2A depicts fluid lines of the expandable pivot irrigation system of FIG. 2.
Figure 2B:
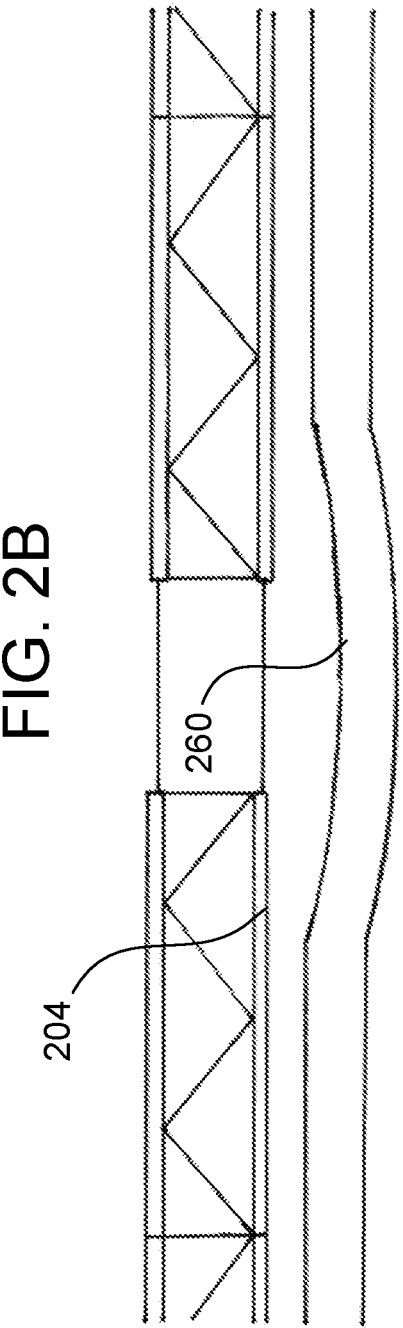
FIG. 2B depicts a fluid line of the expandable pivot irrigation system of FIG. 2 in a taut position.
Figure 2C:
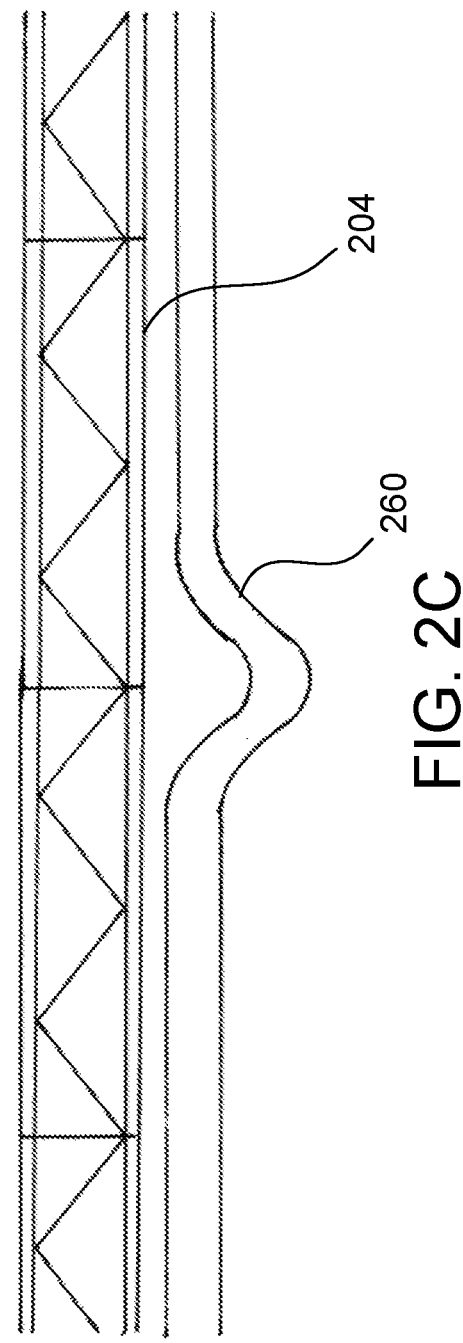
FIG. 2C depicts a fluid line of the expandable pivot irrigation system of FIG. 2 in a slack position.
Figure 2D:
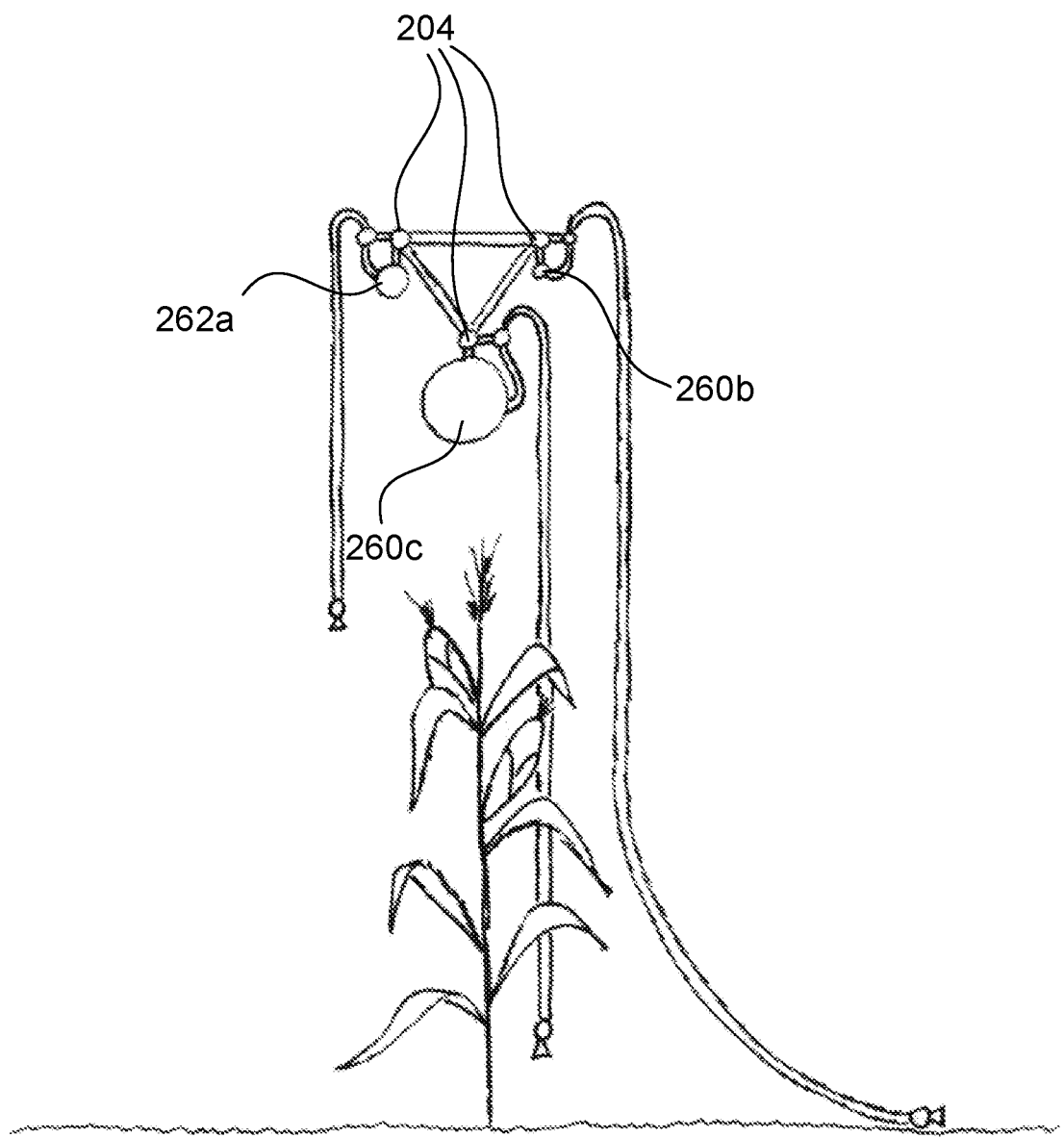
FIG. 2D depicts fluid lines of the expandable pivot irrigation system of FIG. 2A.

FIG. 2 illustrates an embodiment of a portion of an expandable center pivot irrigation system 200 according to the present disclosure. Expandable center pivot irrigation system 200 includes at least one drive unit 202 and a number of spans 204. The various spans 204 and drive units 202 move around a pivot point (not shown) that is typically provided at a center of a plot of land that is to be irrigated. The pivot point may include a control panel that includes a processing unit that controls the operation (movement, irrigation status, etc.) of the expandable center pivot irrigation system 200. Each drive unit 202 may be configured to touch and move along the ground. To this end, each drive unit 202 may include a drive train, wheels 208, and/or various structural supports that facilitate movement of the expandable center pivot irrigation system 200. The spans 204 form a frame structure (such as a combination of trusses and/or other structural supports) of the expandable center pivot irrigation system 200 and extend between the various drive units 202 and/or the pivot point. The spans 204 also provide a mounting point for hoses and/or other conduits that deliver water from the pivot point outward along the expandable center pivot irrigation system 200 to sprinklers (not shown) mounted along a length of the expandable center pivot irrigation system 200. In some embodiments, each span 204 may include one or more expansion joints 206 that allow a length of the span 204 and expandable center pivot irrigation system 200 to expand and contract. While not shown, the hose (or other conduit) and sprinklers may be mounted on along a length of the spans 204 using any variety of techniques. For example, the hose and/or sprinklers may be affixed to a top and/or bottom of the span 204. In some embodiments, a length of hose and/or other fluid line may be suspended from the span 204 along a length of the expandable center pivot irrigation system 200. For example, as illustrated in FIG. 2A, one or more fluid lines 260 may be secured to the spans 204. The fluid lines 260 may be coupled with the spans 204 using collars 262 and/or other mechanical coupling mechanisms. The hose may be distributed such that is hang from the spans 204 with some amount of slack. In this manner, as the expansion joint 206, span 204, and expandable center pivot irrigation system 200 expand, some or all of the slack can be taken up, making the hose more taut as illustrated in FIG. 2B, and when the expansion joint 206, span 204, and expandable center pivot irrigation system 200 contract, the hose may return to a slack position as illustrated in FIG. 2C. In some embodiments, a single fluid line 260 may be secured to the pivot irrigation system 200. For example, a main water line may be provided that delivers water (possibly with one or more additives) to the sprinklers. In other embodiments, one or more other fluid lines 260 are provided. For example, as illustrated in FIG. 2D, three separate fluid lines 260 may be provided that each deliver a different fluid to the sprinklers of the pivot irrigation system 200. For example, a fluid-based fertilizer and/or other nutrient for the crops may be delivered through a first additive fluid line 260a, which may be attached to a first member of span 204. A second additive fluid line 260b may be attached to a second member of span 204 and may deliver a pesticide to the sprinklers. A main water line 260c may be secured to a third member of span 204 and may deliver water (possibly with one or more additives) to the sprinklers. It will be appreciated that the arrangement shown in FIG. 2D is merely representative of a single embodiment of fluid lines and that various arrangements exist.

Figure 3A:
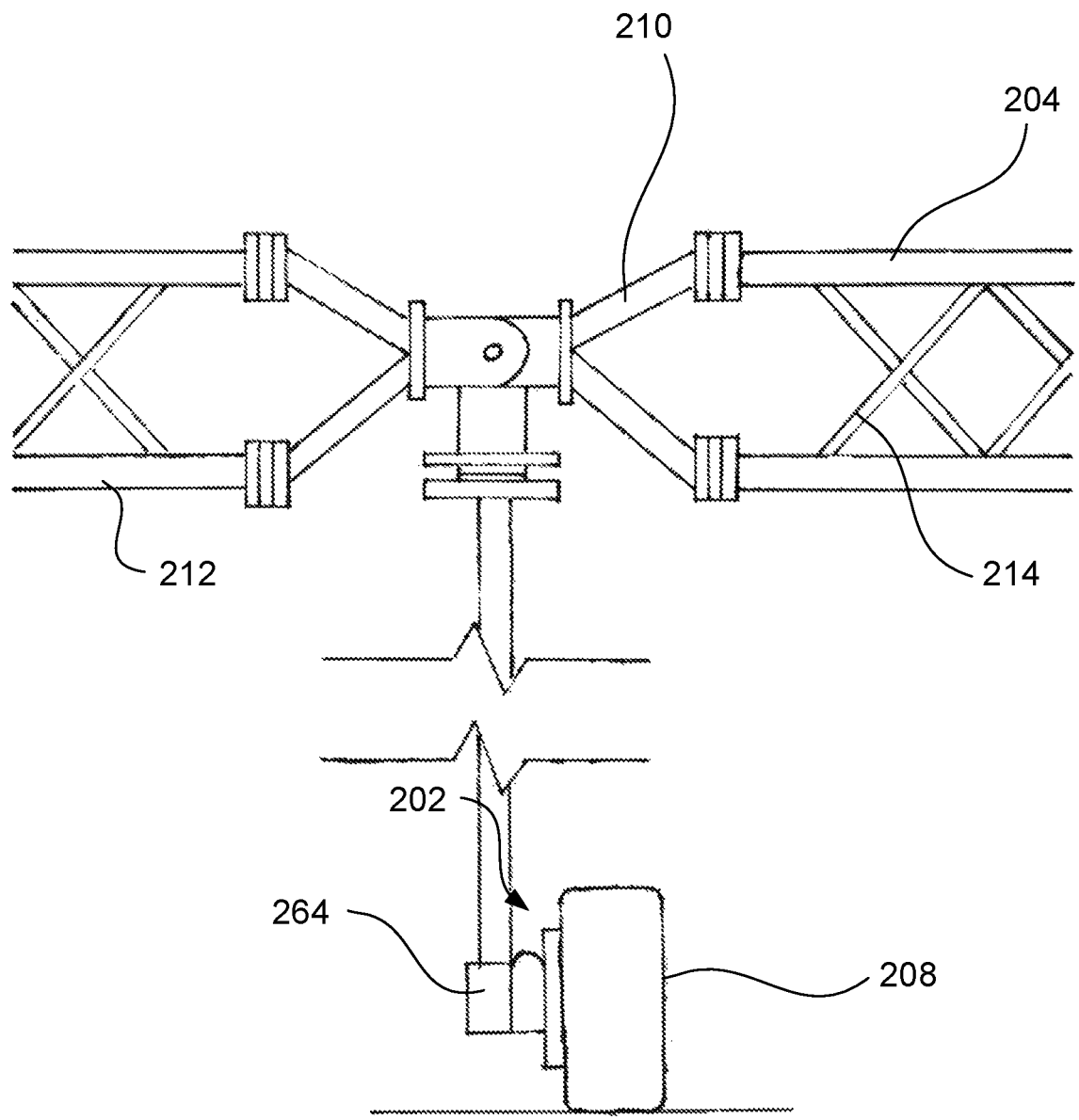
FIG. 3A illustrates a side view of a connection between spans and a drive unit of an expandable pivot irrigation system according to embodiments.
Figure 3B:
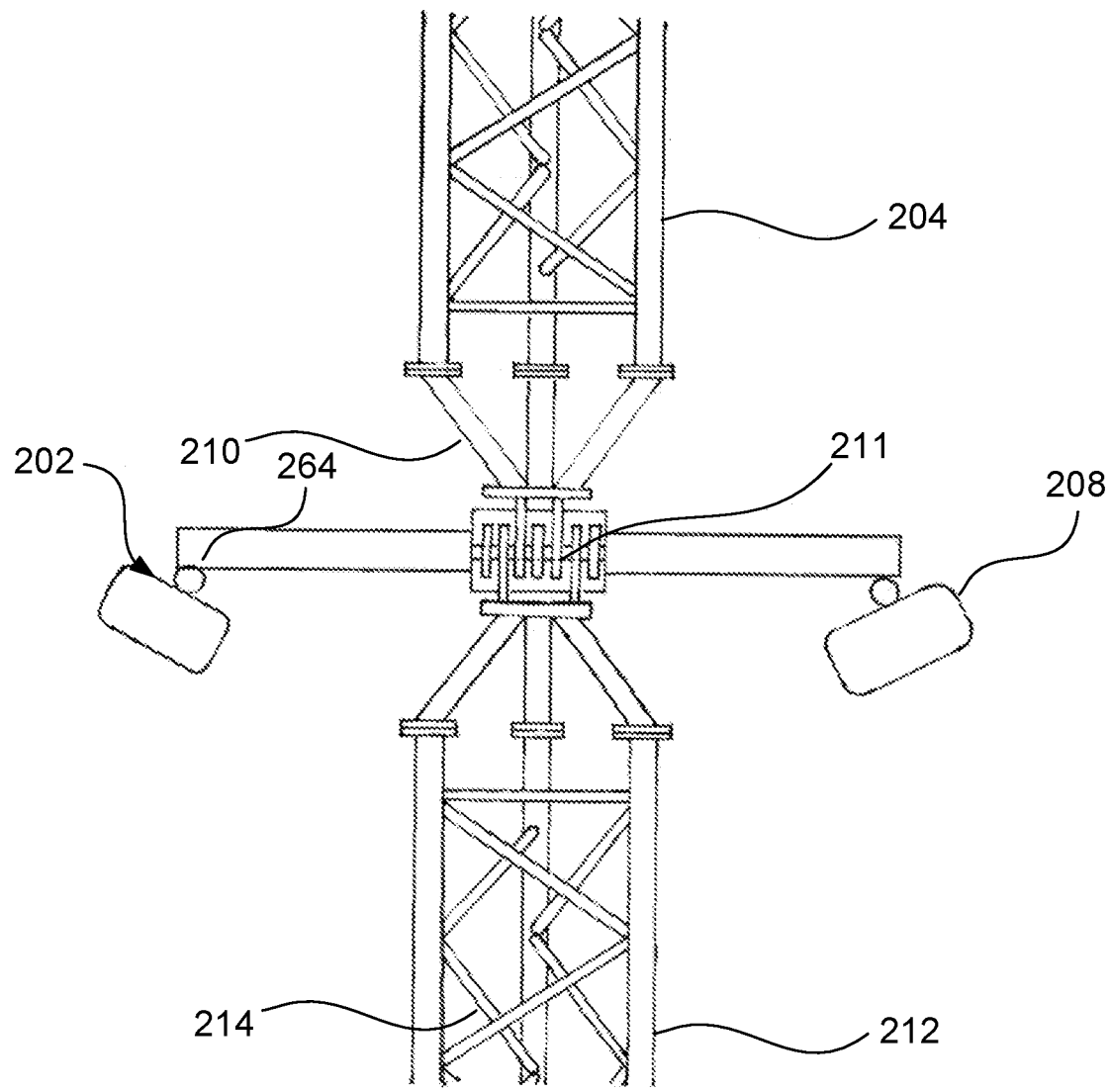
FIG. 3B illustrates a top view of the connection shown in FIG. 3A.
Figure 3C:
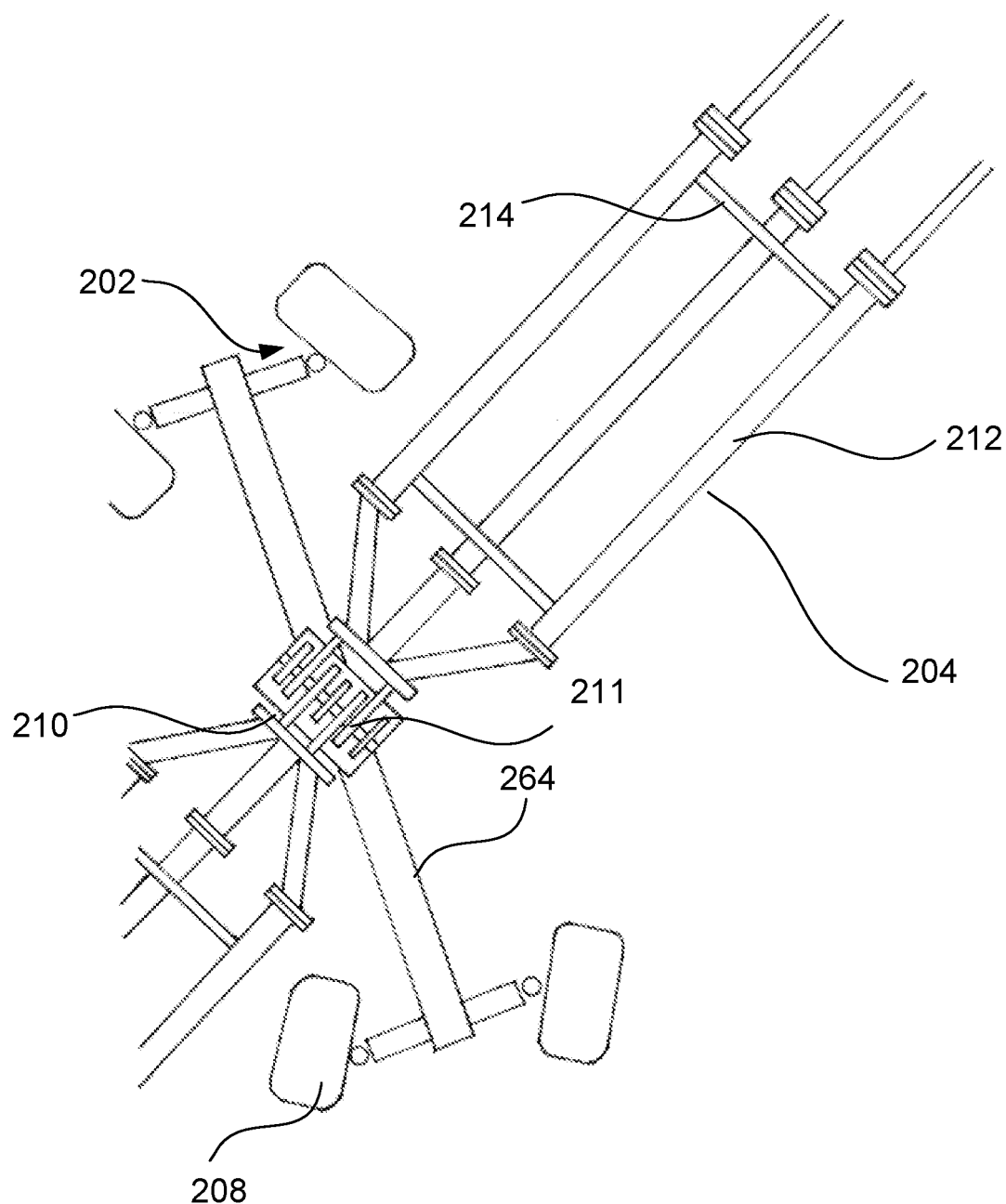
FIG. 3C illustrates a top view of the connection shown in FIG. 3A with wheels and axle pivoted relative to a drive unit.
Figure 3D:
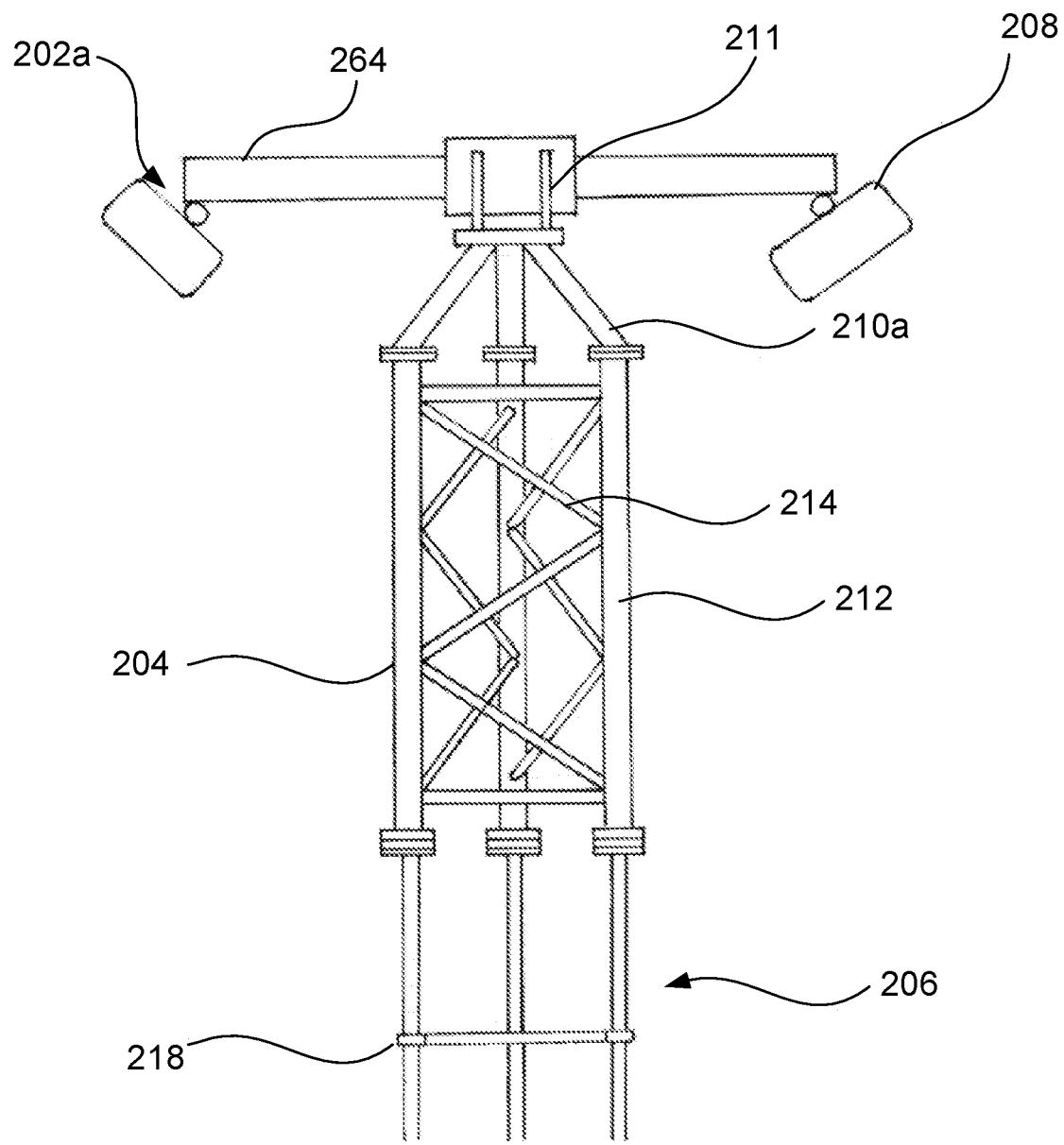
FIG. 3D illustrates a top view of a connection between a span and a last regular drive unit of an expandable pivot irrigation system according to embodiments.

FIGS. 3A-3C illustrate connections between spans 204 and drive units 202. As shown in FIGS. 3A-3C a drive unit 202 is positioned between two spans 204. The drive unit 202 includes a connection 210 on either side of the drive unit 202 such that two spans 204 may be coupled to opposing sides of the drive unit 202. The connection 210 may be positioned above two or more wheels 208, which may be positioned along an axle 264. As best illustrated in FIG. 3B, the connection 210 may include a number of pins 211 and/or other coupling mechanisms that allow the spans 204 to rotate and/or otherwise move in a vertical direction relative to one another and to the connection 210. This may allow the expandable center pivot irrigation system 200 to navigate any bumps, grade changes, and/or other changes in the terrain during movement. The wheels 208 may be positioned on opposing sides of the drive unit 202 and may be steered using controls issued from the control panel. The drive unit 202 may be rotatable relative to the axle 264 and/or wheels 208 to enable freedom of movement in all directions as illustrated in FIG. 3C. In some embodiment, a distal-most span 204 relative to the pivot point may be coupled with a last regular drive unit 202a, as illustrated in FIG. 3D. The last regular drive unit 202a may include only a single connection 210a for a single span 204, but may still include wheels 208, which may be positioned along an axis that is generally orthogonal to a longitudinal axis of the expandable center pivot irrigation system 200.

The wheels 208 of the drive units 202 may follow a generally rectangular path (such as path 102) to expand and contract the expansion joints 206. For example, the wheels 208 (in particular the wheels 208 of the last regular drive unit 202a) may travel along a path that is parallel to the periphery of the field. As the wheels 208 pass beyond a midpoint of the sides of the field, the wheels 208 may pull on the expansion joints 206, causing the expansion joints to expand and lengthen the spans 204 and expandable center pivot irrigation system 200. As the last regular drive unit 202a nears the corner of the field, the wheels 208 may be gradually turned to navigate the corner until the wheels 208 are generally aligned with the next side boundary of the field. As the expandable center pivot irrigation system 200 continues to pivot, the wheels 208 may move from the corner of the field toward the midpoint of the side boundary of the field. As this happens, the wheels 208 push on the expansion joints 206, causing the expansion joints 206 to contract and shorten the spans 204 and expandable center pivot irrigation system 200. This process continues for each side of the field until a generally rectangular irrigation path is formed that covers a significant portion (oftentimes greater than 90%, 95%, 99%, etc.) of the area of the field.

Figure 4:
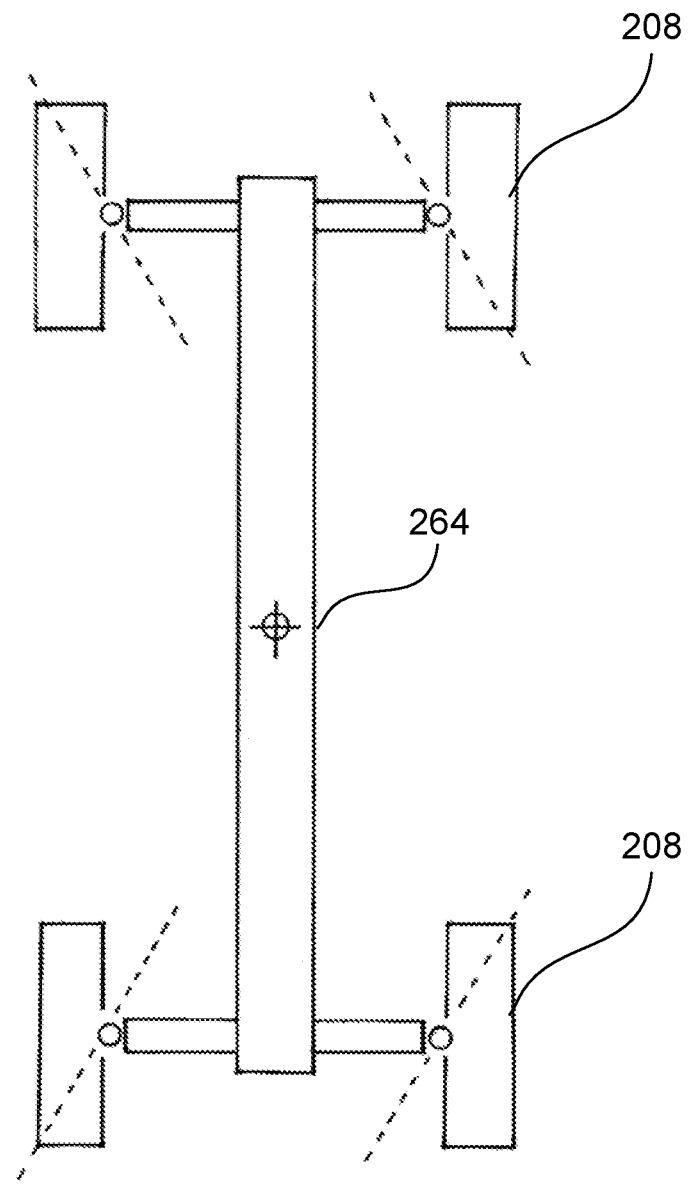
FIG. 4 illustrates a top view of a turning configuration of an expandable pivot irrigation system according to embodiments.

The wheels 208 of the drive units 202 may also follow irregularly shaped paths (such as path 104) to expand and contract the expansion joints 206. For example, the wheels 208 (in particular the wheels 208 of the last regular drive unit 202a) may be turned inward relative to a center point of the expandable pivot irrigation system 200 to push on and contract the expansion joints 206 and may be turned outward to pull on and expand the expansion joints 206. By adjusting the wheel direction, watering paths of various shapes and sizes may be generated to accommodate non-rectangular fields and/or to maneuver the expandable pivot irrigation system 200 about one or more obstructions to meet the needs of a particular application. In some embodiments, it may be desirable to move the expandable pivot irrigation system 200 along a particularly tight curve to minimize water area losses due to a field shape and or obstruction. In some embodiments the wheels 208 may be adjusted accordingly. For example, as illustrated in FIG. 4, the wheels 208 on either side of an axle 264 may be turned in different directions, which may facilitate a smaller turning radius in an active four-wheel steering arrangement. It will be appreciated that the wheels 208 may be capable of performing other steering techniques, such as two wheel steering (front and/or rear), crab steering (all wheels pointed in the same direction) and the like to meet the needs of a particular application.

In order to control the movement (speed and heading) of the various wheels 208 (and subsequently, the expandable pivot irrigation system 200), the expandable pivot irrigation system 200 may include a controller (not shown). The controller may be positioned at any position of the expandable pivot irrigation system 200, such as in or near one of the drive units 202. The controller may be programmed with information about the geometry of the field and/or desired watering path (which may be based on the presence of one or more obstacles). Based on the desired watering path and/or field shape, the controller may operate to control the direction of the wheels 208 to achieve the desired watering path, which may involve the controller sending commands to one or more drive mechanisms of the wheels 208 that drive rotation and/or turning direction of the wheels 208. In some embodiments, directions related to the speed and heading of the wheels 208 to achieve the desired watering path may be programmed into the controller. In other embodiments, the watering path and/or field shape may be programmed into the controller. A last regular drive unit 202a (or other component of the expandable pivot irrigation system 200) may include a global positioning satellite (GPS) sensor and/or other position sensor. The controller may then drive the wheels 208 to trace or otherwise follow the programmed watering path based on a known location of the last regular drive unit 202a. The controller may be programmed with instructions that associate a wheel heading with a particular change in direction of the last regular drive unit 202a, which enables the controller to command the wheels 208 to follow the designated path.

FIGS. 5A-5D illustrate the operation of expansion joints 206. An expansion joint 206 is positioned in between two spans 204 and/or portions of a single span 204. Each span 204 includes a number of longitudinal support beams or pipe 212 that are connecting using a number of struts, trusses, and/or other structural frame members 214 that provide strength and rigidity to the spans 204. While illustrated with three longitudinal support beams or pipes 212 arranged in a generally triangular pattern about a central axis of the span 204, it will be appreciated that any number, shape, size, and/or configuration of longitudinal support beams or pipes 212 may be used to form each span 204. Moreover, in some embodiments, some or all of the spans 204 may have different arrangements of longitudinal support beams or pipes 212 and/or structural frame members 214.

Figure 5A:
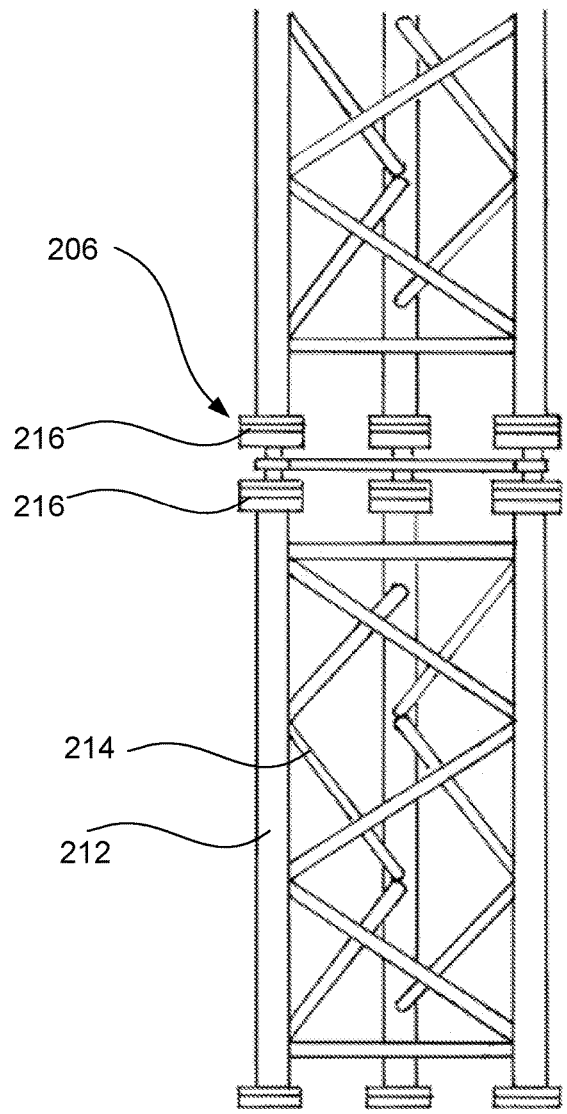
FIG. 5A illustrates a top view of an expansion joint in a compressed state according to embodiments.
Figure 5B:
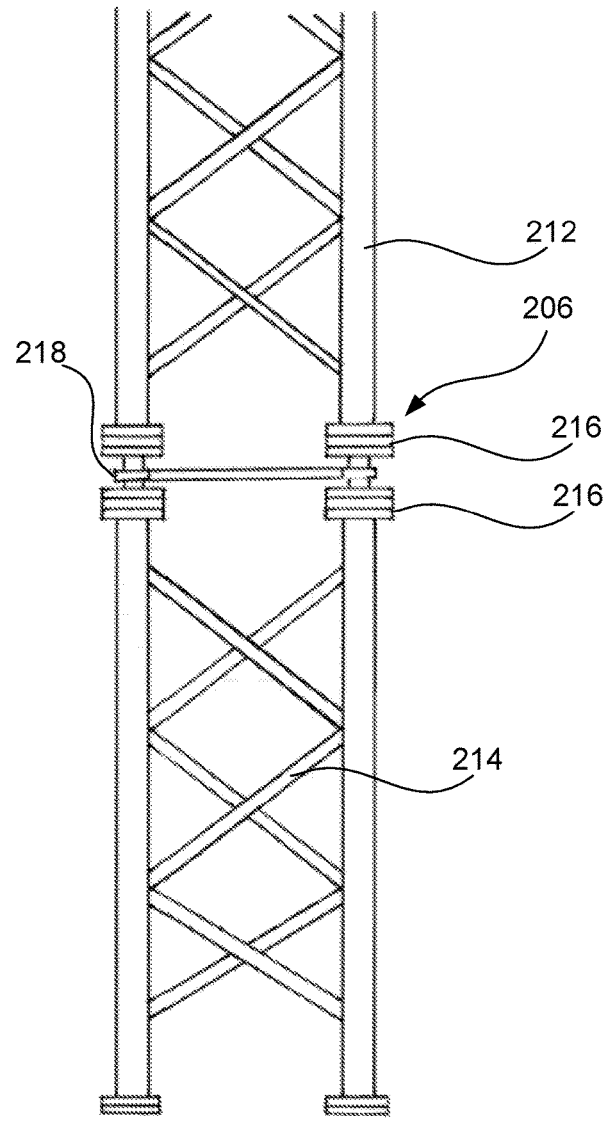
FIG. 5B illustrates a side view of the expansion joint of FIG. 5A in the compressed state.
Figure 5C:
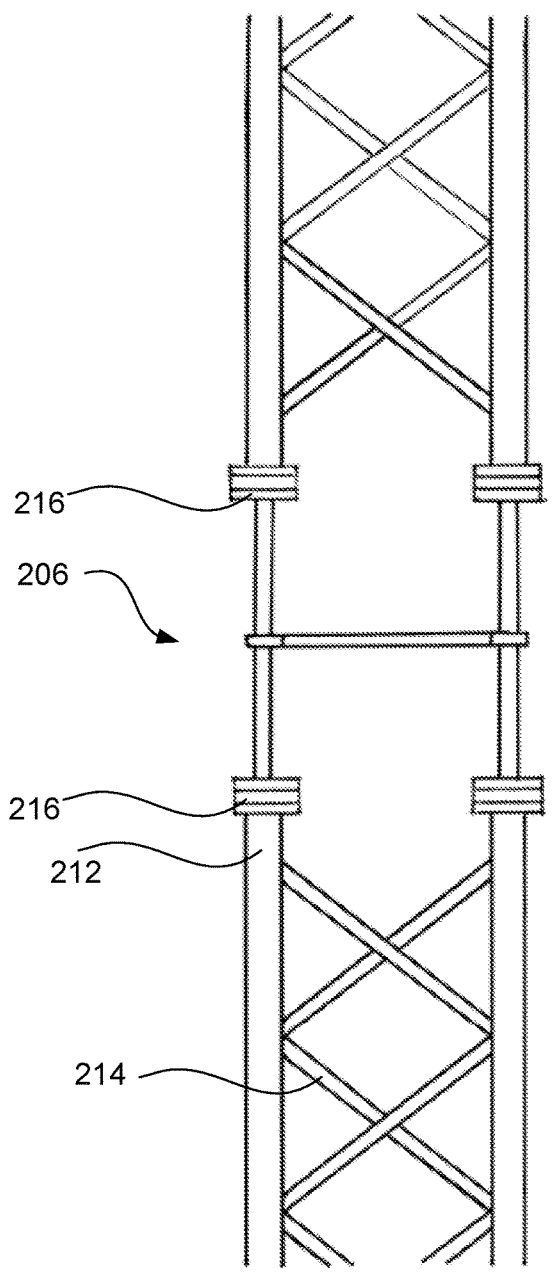
FIG. 5C illustrates a side view of the expansion joint of FIG. 5A in a partially expanded state.
Figure 5D:
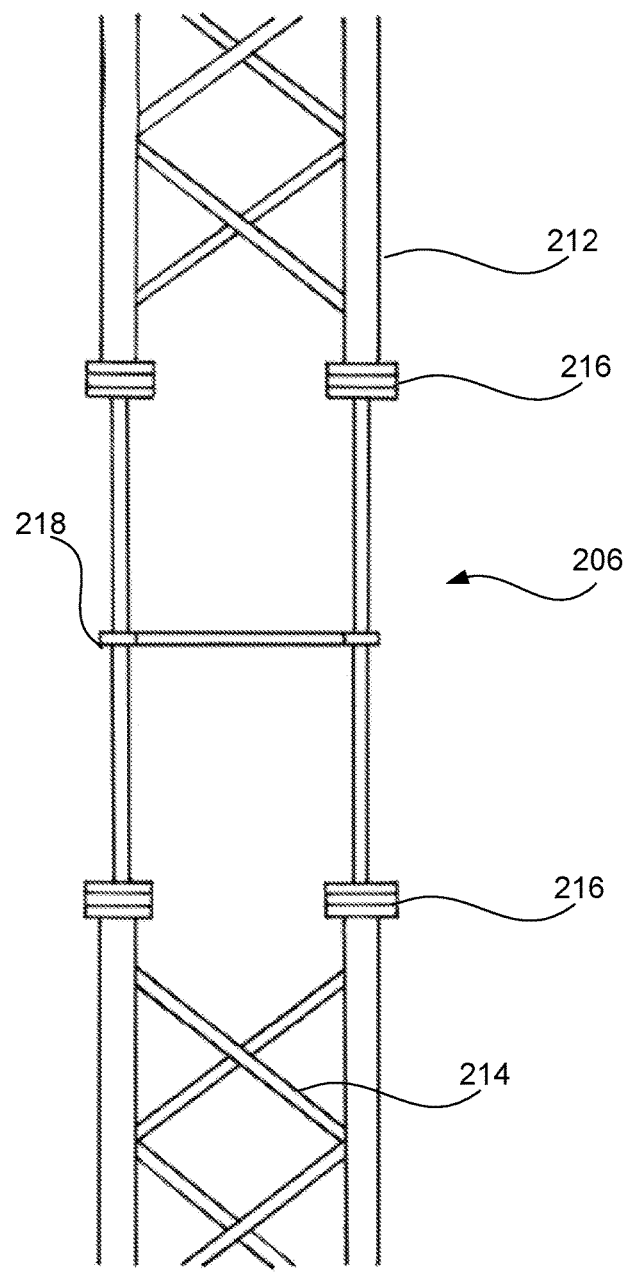
FIG. 5D illustrates a side view of the expansion joint of FIG. 5A in a fully expanded state.

As illustrated in FIGS. 5A and 5B, the expansion joint 206 is in a contracted state, with opposing ends 216 of the expansion joint 206 being drawn close together. As the expansion joint 206 is pulled outward by the movement of wheels as described above, the opposing ends 216 begin to be drawn away from one another as seen in FIG. 5C until the expansion joint 206 is pulled to a fully expanded state as illustrated in FIG. 5D. To help accommodate the potentially large torque forces experienced while expanded, the expansion joint 206 may include one or more reinforcement members 218 that are coupled with a medial portion of the expansion joint 206. These reinforcement members 218 provide additional strength and rigidity to the expansion joints 206. While shown with one reinforcement member 218, it will be appreciated that any number of reinforcement members 218 may be positioned on the expansion joint 206.

Figure 6A:
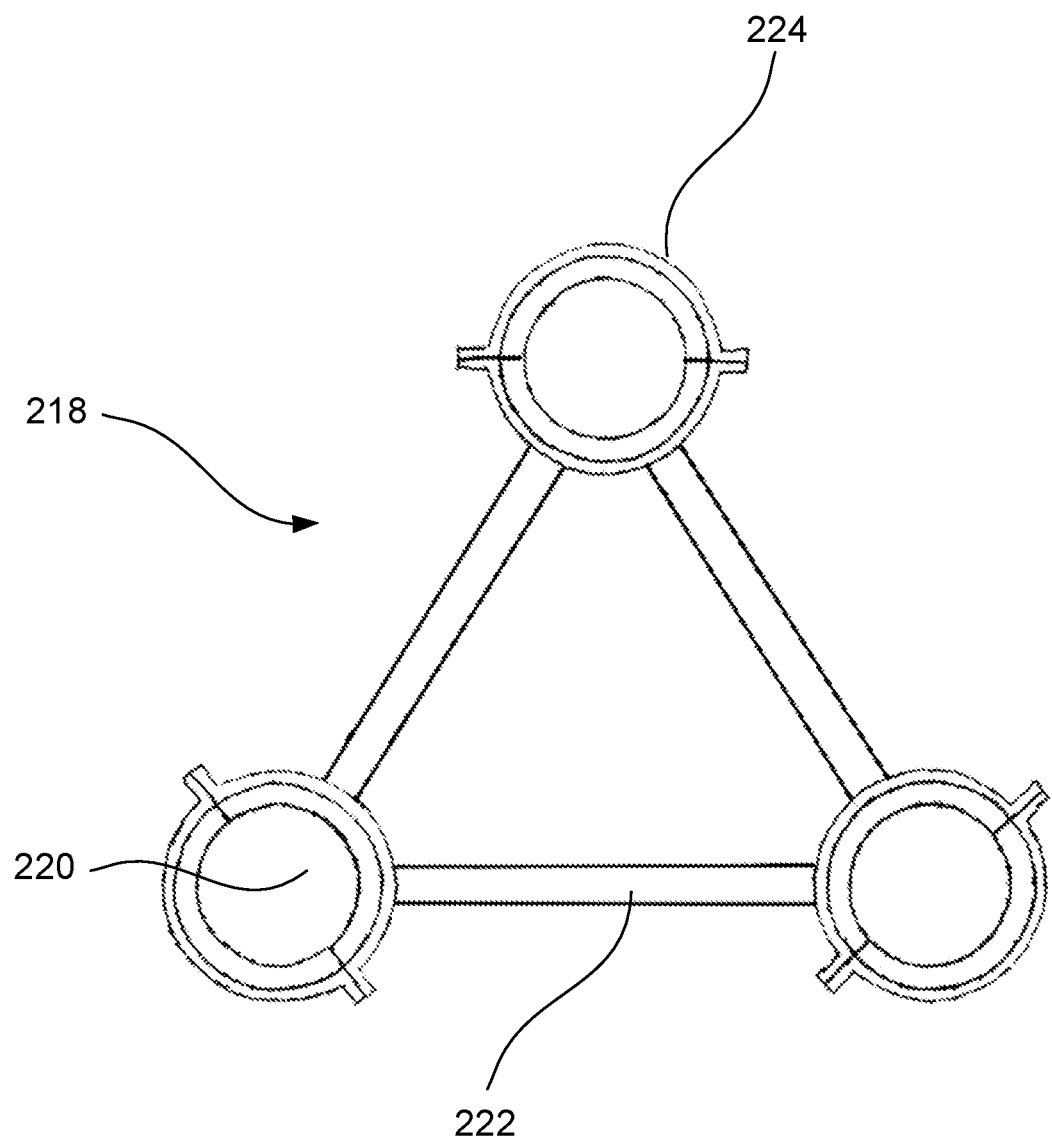
FIG. 6A illustrates reinforcement member according to embodiments.

As shown in FIG. 6A each reinforcement member 218 may define one or more openings 220 that are each configured to receive a respective support structure (such as external and/or internal support structures described in accordance with FIGS. 7A, 7B, and 8A-8C, which may be similar to the longitudinal support beams or pipe 212) of the expansion joint 206. A number of rigid members 222 extend between and connect frames 224 that define the openings 220. As illustrated, the reinforcement member 218 is sized and shaped to match the construction of the spans 204 and expansion joints. For example, the reinforcement members 218 are each generally triangular and define three openings 220 that are connected by three rigid members 222 arranged in a triangular shape. It will be appreciated, however, that other sizes and shapes of reinforcement members 218 may be utilized to meet the needs and designs of a particular expandable center pivot irrigation system 200 application.

Figure 6B:
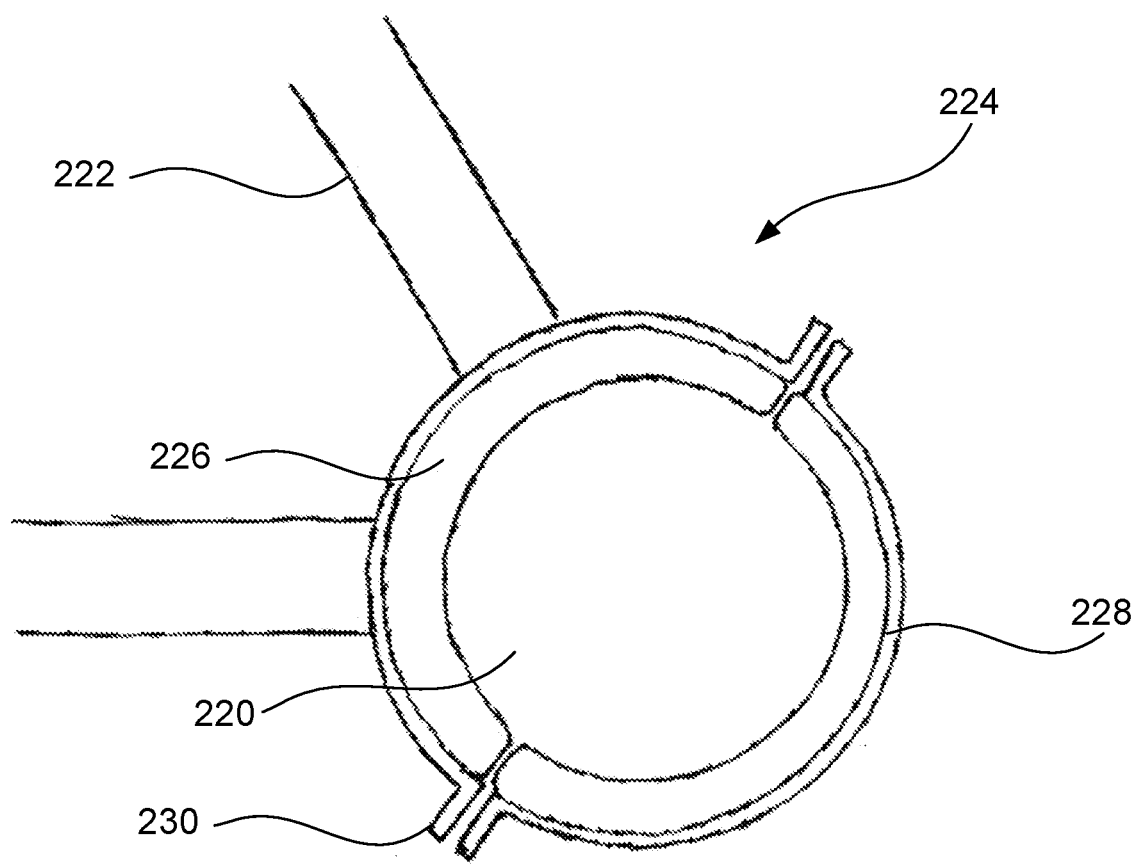
FIG. 6B illustrates a frame of the reinforcement member shown in FIG. 6A.

As shown best in FIG. 6B, in some embodiments, individual ones of the frames 224 form compressible member, similar to pipe clamps, that are used to clamp and/or otherwise secure the frames 224 to a support structure of the expansion joint 206. For example, each frame 224 may include compressible collars that allow the frames 224 to be positioned about and secured to a support structure of the expansion joint 206. For example, the frame 224 may include an inner portion 226 formed from one or more pieces that are configured to contact an outer surface of the support structure of the expansion joint 206. The inner portion 226 may be formed from one or more pieces of a rigid non-metal material, such as a rigid polyurethane or polymer, that are configured to wrap around all or part of the outer surface of the support structure of the expansion joint 206. The frame 224 may also include one or more outer portions 228. For example, the outer portions 228 may include one or more members that form one or more gaps that may be used to receive a portion of the support structure of the expansion joint 206. In some embodiments, the inner portion 226 and outer portions 228 may be formed integral with one another. As illustrated, the outer portion 228 includes two generally C-shaped members that may be interfaced with one another to form a generally circular opening 220 For example, each C-shaped member includes a flange 230 on either end of the C-shaped member. Flanges 230 of each C-shaped member may be positioned flush against one and secured to one another using one or more fasteners, such as bolts and nuts. In some embodiments, rather than having two C-shaped members, the outer portion 228 may include a single member that extends along an entire periphery of the support of the expansion joint 206. The single member may include a gap between two ends of the single member that may be opened to receive the support structure of the expansion joint 206 and then closed and fastened and/or clamped together to secure the support structure of the expansion joint 206 within the opening 220. In other embodiments, other types of clamping mechanisms may be used, such as those that utilize threaded adjustment mechanisms, quick-release mechanisms, and the like.

Figure 7A:
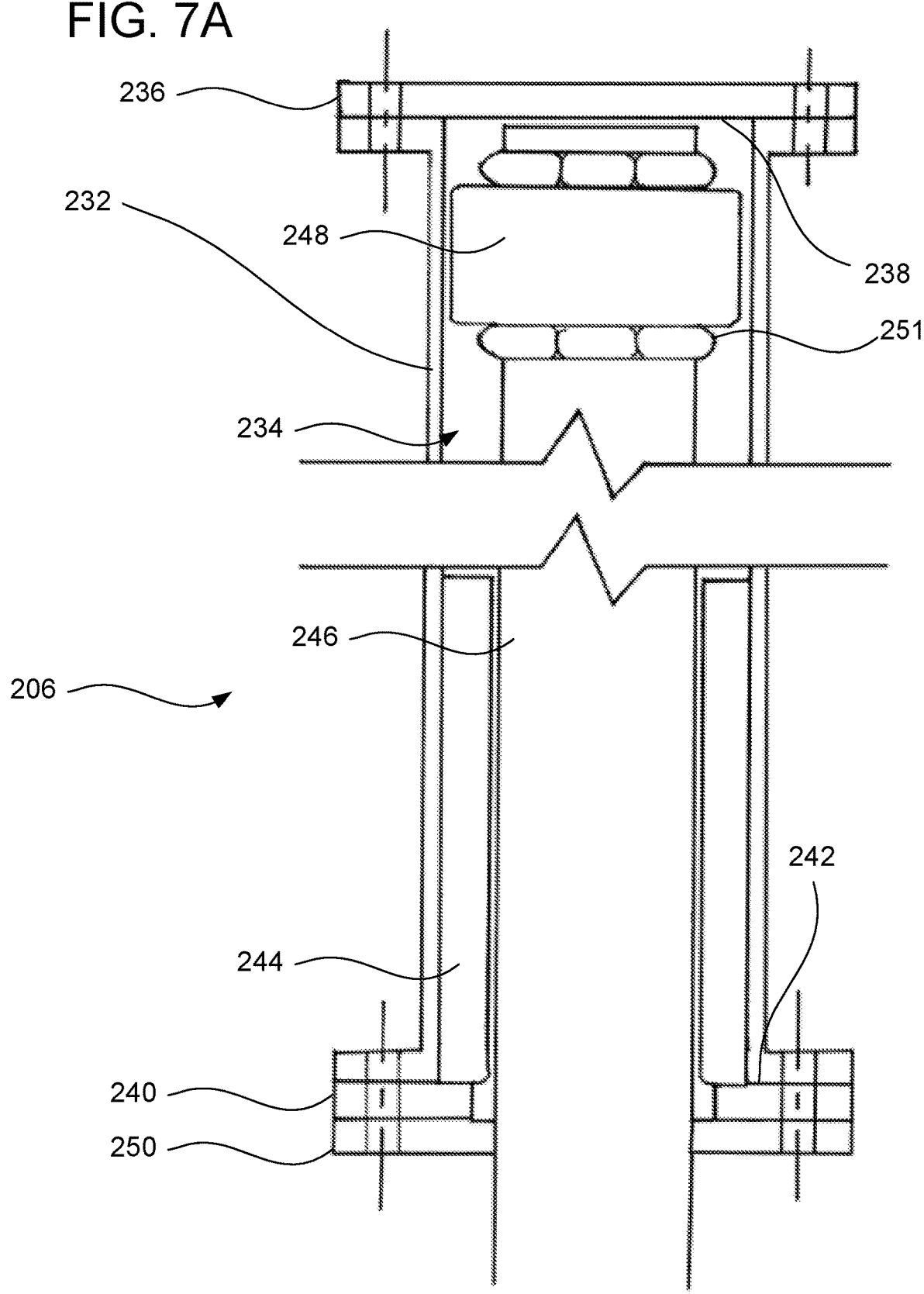
FIG. 7A illustrates a cross-sectional view of an expansion joint in a compressed state according to embodiments.
Figure 7B:
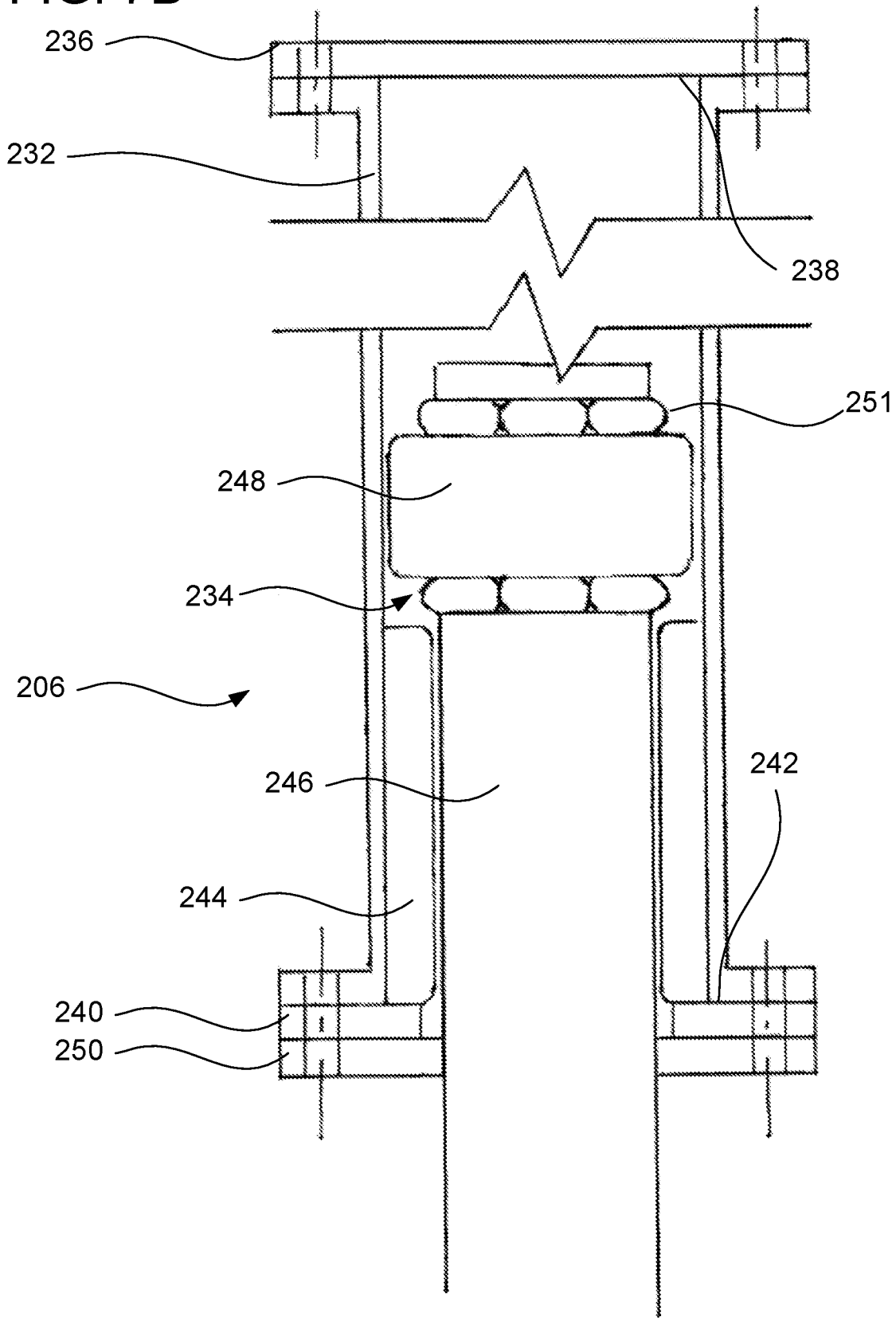
FIG. 7B illustrates a cross-sectional view of the expansion joint of FIG. 7A in an expanded state.

FIGS. 7A and 7B illustrate cross sections of one embodiment of an expansion joint 206. Each expansion joint 206 may include two external support structures 232 (only one is shown here) that face opposite directions and that are separated by and connected using an internal support structure 234. The external support structures 232 may be hollow and define conduits that are configured to slidably receive a portion of the inner support structure 234. A distal end of each external support structure 232 includes a stop flange 236. Here, the stop flange 236 is the form of a plate that has a greater diameter than the external support structure 232 such that edges of the plate extend beyond the periphery of the external support structure 232 to form a flange that is usable to couple the expansion joint 206 to a span 204 and/or a main body of the external support structure 232, such as shown in FIGS. 5A-5D. The stop flange 236 also serves to provide an inner surface 238 that a distal end of the internal support structure 234 contacts during contraction of the expansion joint 206 and while the expansion joint 206 is in a fully compressed state. The inner surface 238 of stop flange 236 limits the distance that the inner support structure 234 can be moved during contraction of the expansion joint 206. A medial end of each external support structure 232 may also include stop flange 240. Here, stop flange 240 provides an inner surface 242 that limits the distance that the inner support structure 234 can be moved during expansion of the expansion joint 206. Unlike stop flange 236, stop flange 240 is not a solid plate, but instead defines a central aperture that allows the inner support structure 234 to slide in and out of the external support structure 232 to expand and contract the expansion joint 206. A bushing 244 and/or roller bearing, such as a polyurethane bushing, may be inserted within the conduit of the expansion 206. Bushing 244 may be press fit and/or otherwise secured within the conduit and may help facilitate the sliding of the inner support structure 234 by providing a low friction sliding surface that limits movements of the inner support structure 234 relative to the external support structure 232 that are not parallel to a longitudinal axis of the external support structure 232. The bushing 244 may be pushed flush against the inner surface of the stop flange 240.

The inner support structure 234 may have an elongate body 246 that terminates in ends that have larger diameters than both the elongate body 246 and the bushing 244. This allows the elongate body 246 to slide within the bushing 244 and the larger diameter of the ends to contact an end of the bushing 244 to limit the expansion of the expansion joint 206. For example, the end of the inner support structure 234 may include a threaded connector that is configured to receive a bushing 248 that has a larger diameter than the elongate body 246. Bushing 248 may be secured to the inner support structure 234 using one or more fasteners 251, such as lock nuts, and/or may be secured using other techniques, such as welding. The bushing 248 may have a diameter that is just slightly smaller than an inner diameter of the conduit of the external support structure 232. Such a design helps prevent any movement of inner support structure 234 in a direction that is not along the longitudinal axis of the external support structure 232.

In some embodiments, the expansion joint 206 may include one or more sealing members 250, such as a rubber seal or gasket. The sealing member 250 may be positioned proximate the stop flange 240 and may prevent ingress of dirt and/or other debris into the interior of the expansion joint 206 as the inner support structure 234 slides into and out of the external support structures 232. In some embodiments, the sealing member 250 may be fastened, adhered, and/or otherwise secured to an surface of the stop flange 240, which in turn may be secured to a flange formed on a distal end of the external support structure 232. In some embodiments, one or both stop flanges 236, 240 may be formed integrally with the external support structure 232.

In operation, the expansion joint 206 may be moved between a compressed state shown in FIG. 7A and an expanded state shown in FIG. 7B. In the compressed state, the ends of inner support structure 234 are each pressed against the inner surface 238 of stop flange 236, with a significant portion of the elongate body 246 being stored within the external support structure 232 on either end of the inner support structure 234 as best illustrated in FIG. 5B. As the expansion joint 206 starts to expand, the ends of the inner support structure 234 are drawn away from the inner surface 238 and toward the inner surfaces 242 of each external support structure 232. At a fully expanded state, the ends of the inner support structure 234 contacts ends of the bushing 248, which prevents the ends of the inner support structure 234 from expanding any further. In such a state, a significant portion of the elongate body 246 is positioned outside of the external support structures 232 and the opposing external support structures 232 are drawn apart from one another, as best illustrated in FIG. 5D. To compress the expansion joint 206, the ends of the inner support structure 234 may be pushed toward inner surfaces 238 until the ends contact the inner surfaces 238 once again. The expansion and contraction of the expansion joint 206 may be entirely mechanical and may be driven by the forces exhibited on the expandable center pivot irrigation system 200 as the wheels 208 move the expandable center pivot irrigation system 200 as described above.

Figure 8A:
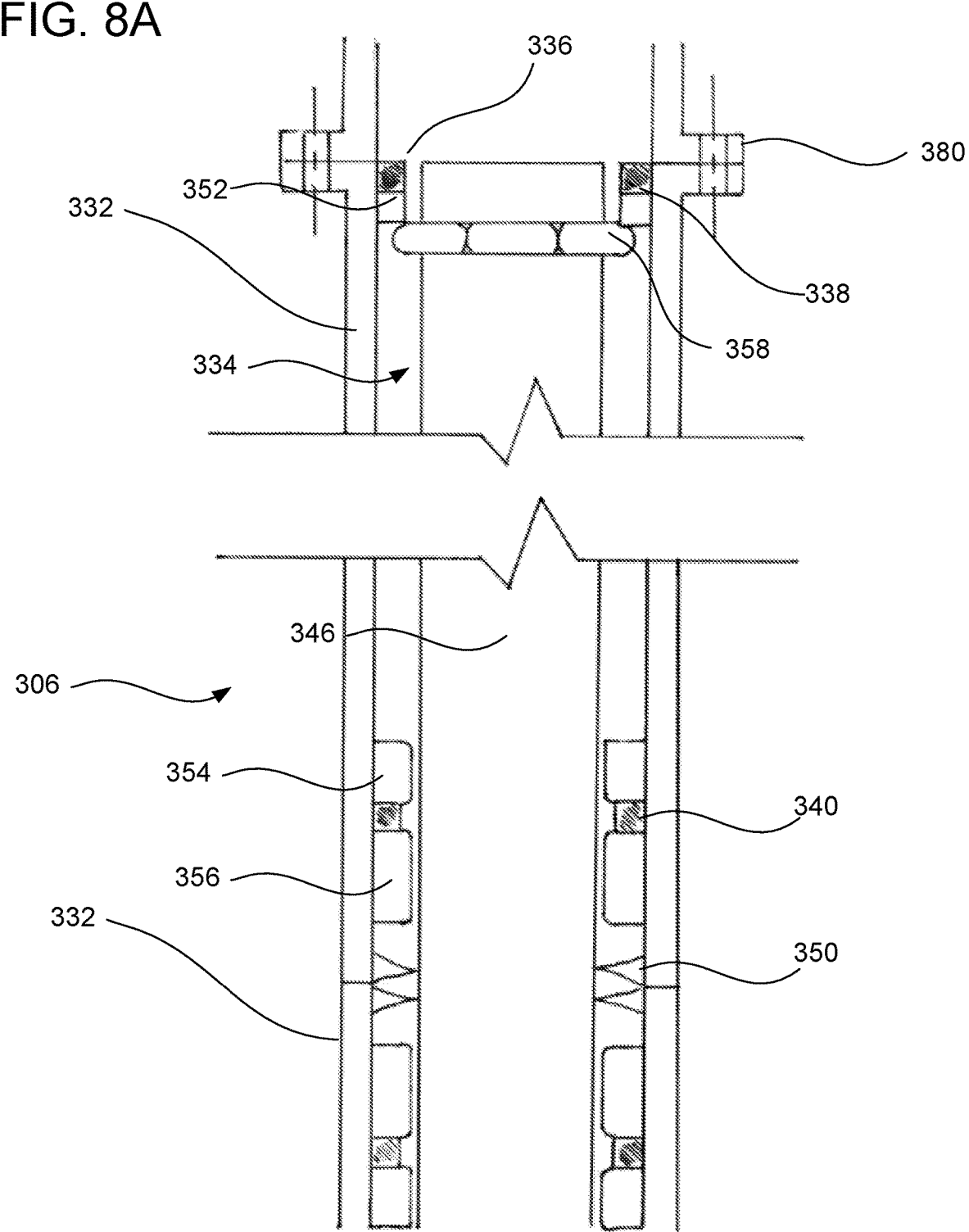
FIG. 8A illustrates a cross-sectional view of an expansion joint in a compressed state according to embodiments.
Figure 8B:
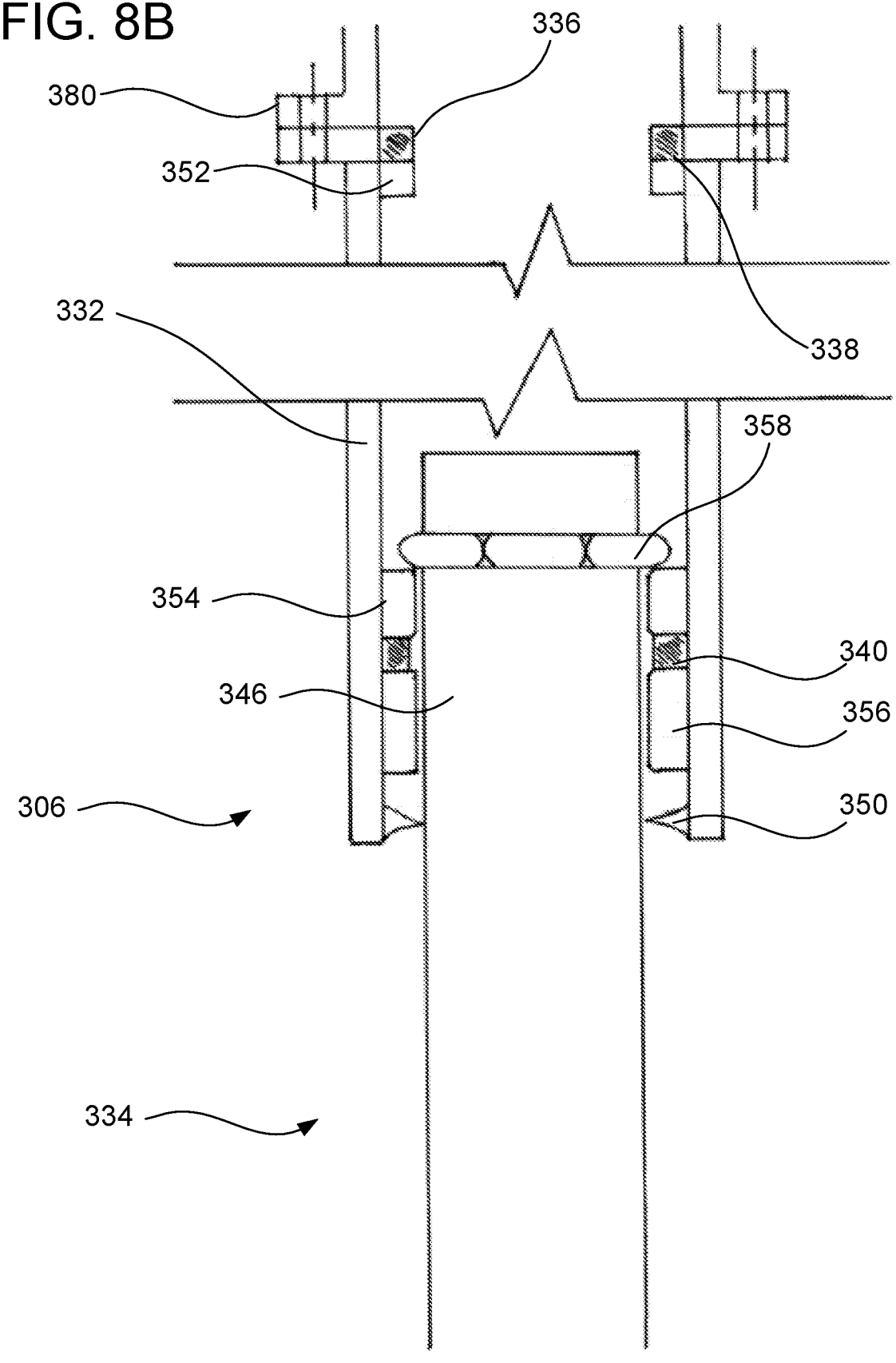
FIG. 8B illustrates a cross-sectional view of the expansion joint of FIG. 7A in an expanded state.

FIGS. 8A and 8B illustrate an alternative embodiment of an expansion joint 306. Expansion joint 306 may be similar to expansion joint 206 and may be usable with expandable center pivot irrigation system 200 described above. Like expansion joint 206, expansion joint 306 includes two external support structures 332 (only one is fully shown here) that face opposite directions and that are separated by and connected using an internal support structure 334. The distal ends of each external support structure 232 may include a flange 380 that is usable to couple the expansion joint 306 with a span 204. An interior of the distal end of each external support structure 332 includes a stop 336. As illustrated, the stop 336 is an annular member that may be welded and/or otherwise secured within the conduit of the external support structure 332. The annular member serves to reduce a diameter of the conduit and provides an inner surface 338 that is positioned against a bushing 352. Bushing 352 then is usable to limit the distance that the inner support structure 334 can be moved during contraction of the expansion joint 306 by contacting a distal end of the internal support structure 334 during contraction of the expansion joint 306.

A medial end of each external support structure 332 may also include stop 340. Stop 340 may be an annular member that is welded and/or otherwise secured within the conduit of the external support structure 332. Stop 340 sets the position of bushings 354 and 356, which may help the inner support structure 334 slide relative to and stay properly aligned with the external support structure 332. In some embodiments, bushing 354 may be a polyurethane bushing and bushing 356 may be an oil free bushing.

The inner support structure 334 may have an elongate body 346 that terminates in ends that have larger diameters than the elongate body 346, bushing 352, and bushing 354. This allows the elongate body 346 to slide within the bushing 352 and the larger diameter of the ends to contact an end of the bushing 352 to limit the expansion of the expansion joint 306. For example, the end of the inner support structure 334 may include a threaded connector that is configured to receive a lock nut 358 and/or other fastener or member having a sufficiently large diameter.

In some embodiments, the expansion joint 306 may include one or more sealing members 350, such as a rubber seal or gasket. The sealing member 350 may be positioned at a medial end of the external support member 334 and may prevent ingress of dirt and/or other debris into the interior of the expansion joint 306 as the inner support structure 334 slides into and out of the external support structures 332. In some embodiments, the sealing member 350 may be fastened, adhered, and/or otherwise secured the external support structure 332.

In operation, the expansion joint 306 may be moved between a compressed state shown in FIG. 8A and an expanded state shown in FIG. 8B. In the compressed state, the ends of inner support structure 334 are each pressed against the bushing 352, with a significant portion of the elongate body 346 being stored within the external support structure 332 on either end of the inner support structure 334 as best illustrated in FIG. 5B. As the expansion joint 306 starts to expand, the ends of the inner support structure 334 are drawn away from the bushing 352 and toward the bushing 354 of each external support structure 332. At a fully expanded state, the ends of the inner support structure 334 contacts ends of the bushing 354, which prevents the ends of the inner support structure 334 from expanding any further. In such a state, a significant portion of the elongate body 346 is positioned outside of the external support structures 332 and the opposing external support structures 332 are drawn apart from one another, as best illustrated in FIG. 5D. To compress the expansion joint 306, the ends of the inner support structure 334 may be pushed toward bushing 252 until the ends contact the bushing 252 once again. The expansion and contraction of the expansion joint 306 may be entirely mechanical and may be driven by the forces exhibited on the expandable center pivot irrigation system 200 as the wheels 208 move the expandable center pivot irrigation system 200 as described above.

Figure 9A:
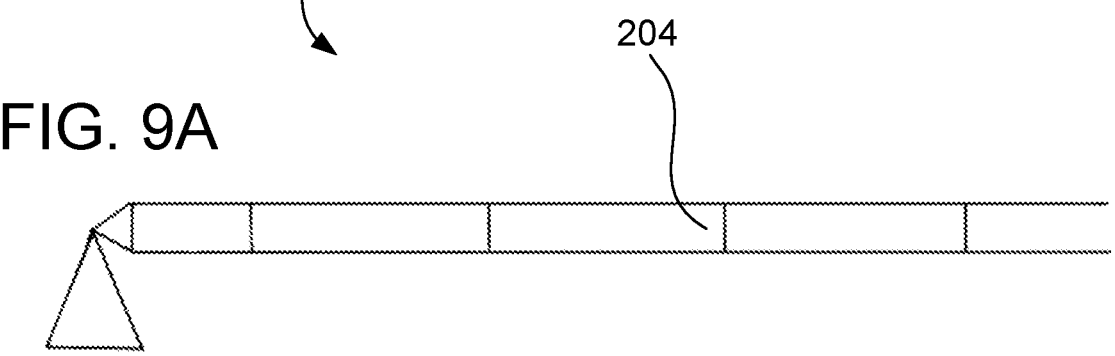
FIG. 9A illustrates a cross-sectional view of an expandable center pivot irrigation system in a compressed state according to embodiments.
Figure 9B:
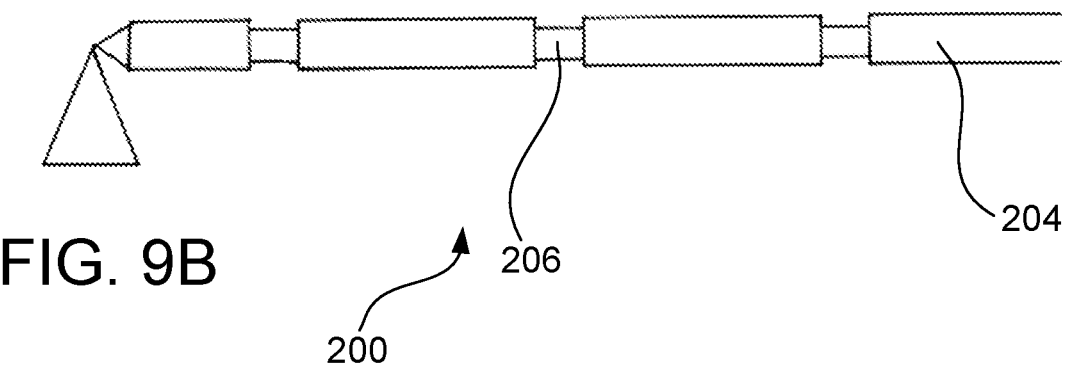
FIG. 9B illustrates a cross-sectional view of the expandable center pivot irrigation system of FIG. 9A in an expanded state.

FIGS. 9A and 9B illustrate the lengthening of the expandable center pivot irrigation system 200 during expansion of the expansion joints (206 and/or 306). FIG. 9A illustrates an expandable center pivot irrigation system 200 having several spans 204 that are connected using expansion joints 206. here, expansion joints 206 are in a compressed state and the length of expandable center pivot irrigation system 200 is at a minimum. In FIG. 9B, the expansion joints 206 are all in a fully expanded state and the expandable center pivot irrigation system 200 is at its full length.

It will be appreciated that the number and dimensions of spans and expansion joints may be modified to fit the needs of a particular application. It will be further appreciated that the expansion joints and spans described herein may be formed from any suitable materials, although materials that are able to withstand large amounts of torque, such as metal alloys are typically preferred. Additionally, it will be appreciated that while FIGS. 7A, 7B, 8A, and 8B illustrate a single set of support members, it will be appreciated that oftentimes a single expansion joint may include several sets of support members arranged in parallel (and often coupled using one or more reinforcement members) to match an arrangement of support beams of the spans that are being connected.

Figure 10A:
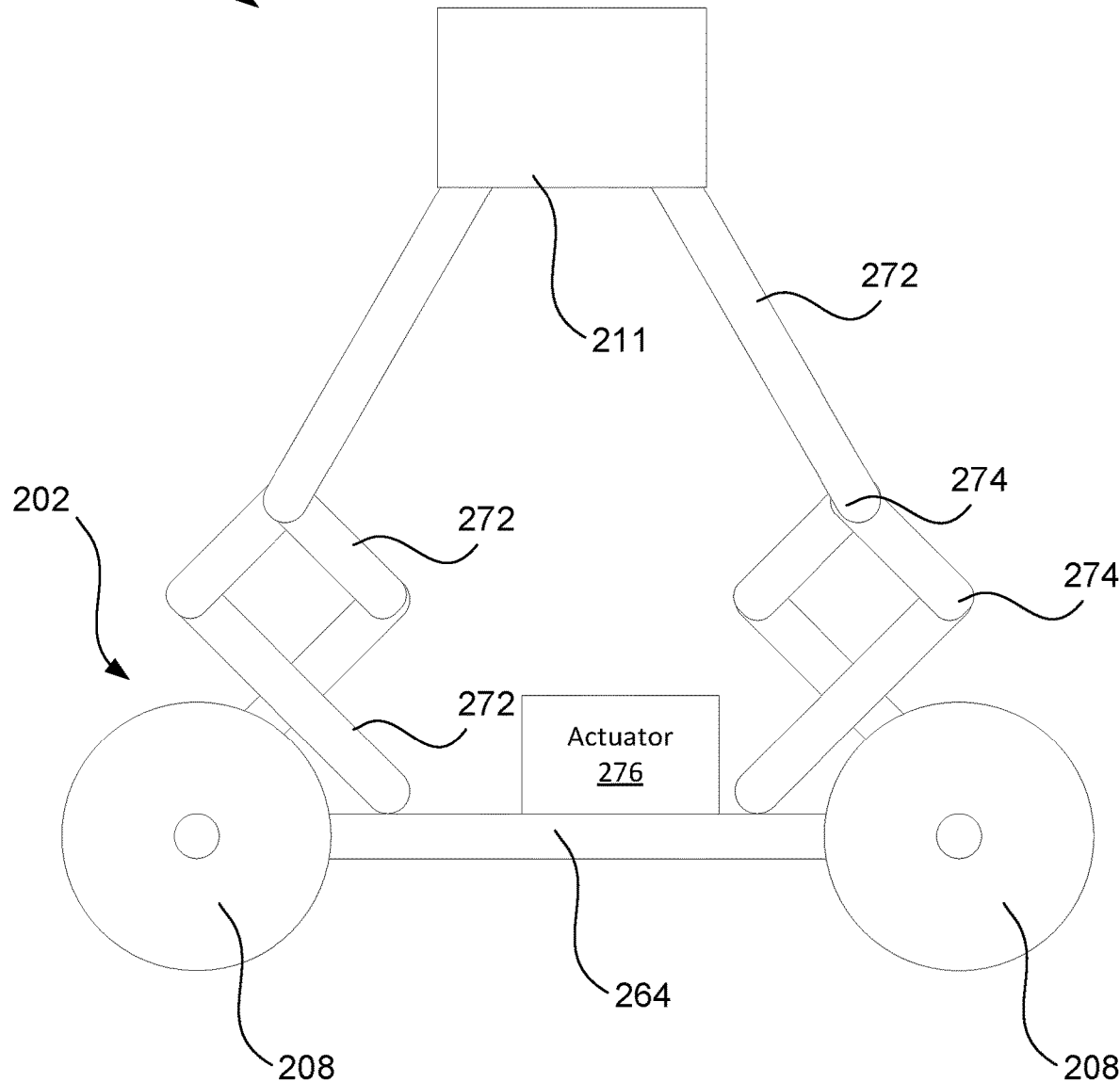
FIG. 10A illustrates a height adjustment mechanism for an expandable pivot irrigation system according to embodiments.
Figures 10B, 10C:
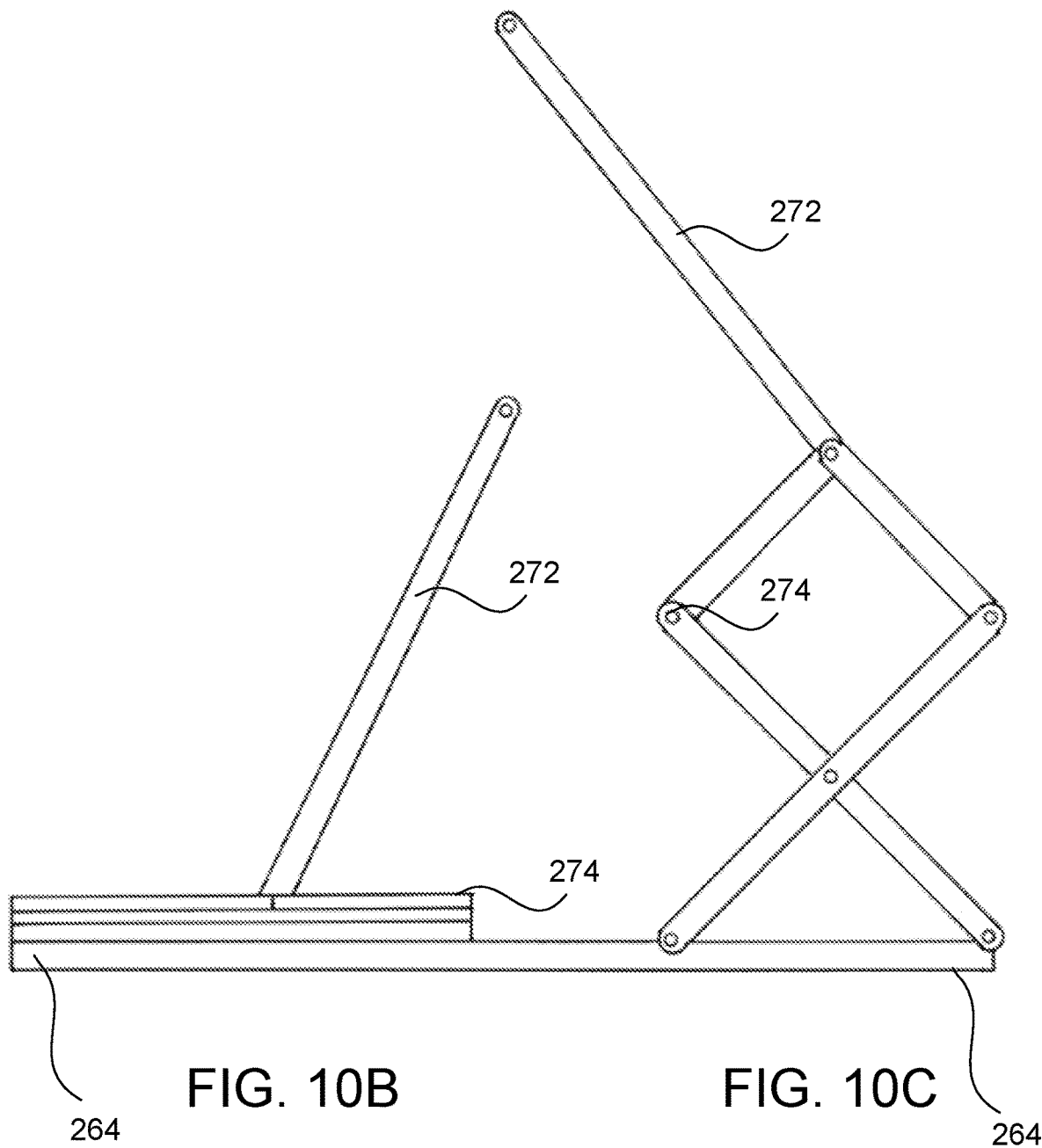
FIG. 10B illustrates the height adjustment mechanism of FIG. 10A in a raised position.
FIG. 10C illustrates the height adjustment mechanism of FIG. 10A in a lowered position.

In some embodiments, it may be desirable for the expandable pivot irrigation system 200 to have an adjustable height. In particular, many agricultural areas are often in the path of severe storm cells. These storm cells may generate high wind loads that may tip and/or damage the expandable pivot irrigation system 200. Therefore, some embodiments of expandable pivot irrigation system 200 may include a height adjustment mechanism that enables the expandable pivot irrigation system 200 to be lowered (such as to a height below a top of the crop being watered) when not in use and/or when the a storm is imminent. For example, as shown in FIG. 10A, a scissor lift 270 and/or other lift mechanism may be positioned between each axle 264 and drive unit 202. The scissor lift 270 may include a number of pivoting arms 272 that are coupled by hinges 274. An actuator 276, such as (but not limited to) a hydraulic and/or pneumatic lift, may be used to raise the scissor lift 270 (as shown in FIGS. 10A and 10B) and lower the scissor lift 270 (as shown in FIG. 10C).

In order to control the operation of the scissor 270, a controller may be provided. In some embodiments, this controller may be the same that operates the wheels 208, although separate controllers may be used in some embodiments. The controller may send commands to the actuator 276 that cause the actuator 276 to raise and lower the scissor lift 270. In some embodiments, the controller may command the actuator to raise and/or lower the scissor lift 270 based on a signal received from a remote source. For example, a wireless communications interface coupled with the controller may receive an indication from a remotely located device that a storm is imminent, which may cause the controller to initiate lowering of the expandable pivot irrigation system 200. An additional indication may be received when the storm has passed, which may cause the controller to raise the expandable pivot irrigation system 200. In other embodiments, when the expandable pivot irrigation system 200 is not in use the controller may initiate lowering of the expandable pivot irrigation system 200.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A pivot irrigation system, comprising:
 a pivot structure comprising a plurality of pivots that are coupled end to end in series, wherein the plurality of pivots comprise:
  a center pivot; and
  at least one additional pivot coupled with the center pivot, wherein:
   movement of the at least one additional pivot is facilitated by a plurality of wheels coupled with the pivot structure, and
   connections between at least some adjacent ones of the plurality of pivots comprise an expansion joint;
   each expansion joint is configured to expand when the at least one additional pivot moves about a rotational axis of the pivot structure while the plurality of wheels are turned outward relative to the center pivot;

each expansion joint is configured to contract when the at least one additional pivot moves about the rotational axis while the plurality of wheels are turned inward relative to the center pivot;

each expansion joint comprises:
- an inner support member having an elongate body terminating in ends having diameters that are larger than a diameter of the elongate body;
- a first external support member; and
- a second external support member, wherein:

each of the first external support member and the second external support member define an open interior that is configured to slidingly receive a respective end of the inner support member; and each of the first external support member and the second external support member comprise a stop member positioned on either end of the open interior that limit a range of movement of the respective end of the inner support member; and an irrigation fluid line coupled with the pivot structure externally to each expansion joint, wherein the irrigation fluid line is coupled with the pivot structure such that there is slack in the irrigation fluid line when any of the expansion joints are not fully extended.

2. The pivot irrigation system of claim 1, further comprising:
a processing unit that is configured to control operation of the plurality of wheels to drive movement and direction of the pivot irrigation system.

3. The pivot irrigation system of claim 2, wherein:
the processing unit controls the operation of the plurality of wheels based on a predefined shape of a watering path for the pivot irrigation system.

4. The pivot irrigation system of claim 3, wherein:
the predefined shape of the watering path is non-circular.

5. The pivot irrigation system of claim 4, wherein:
the non-circular watering path is generating by the pivot structure rotating about the rotational axis.

6. The pivot irrigation system of claim 1, wherein:
expansion of each expansion joint is driven by rotation of the plurality of wheels while the plurality of wheels is turned outward relative to the rotational axis and contraction of each expansion joint is driven by rotation of the plurality of wheels while the plurality of wheels is turned inward relative to the rotational axis.

7. The pivot irrigation system of claim 1, further comprising:
a height adjustment mechanism that raises and lowers a height of the pivot structure.

8. The pivot irrigation system of claim 7, further comprising:
a processing unit that is configured to control operation of the height adjustment mechanism in response to receiving a command.

* * * * *